(12) United States Patent
Lee et al.

(10) Patent No.: US 10,251,098 B2
(45) Date of Patent: Apr. 2, 2019

(54) USER EQUIPMENT AND CIRCUIT-SWITCHED FALLBACK METHOD THEREOF

(71) Applicant: MEDIATEK INC., Hsin-Chu (TW)

(72) Inventors: Chi-Chen Lee, Taipei (TW); Songsong Jia, Beijing (CN); Shaojun Luo, Beijing (CN)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/910,903

(22) PCT Filed: Oct. 28, 2015

(86) PCT No.: PCT/CN2015/093118
§ 371 (c)(1),
(2) Date: Feb. 8, 2016

(87) PCT Pub. No.: WO2016/066110
PCT Pub. Date: May 6, 2016

(65) Prior Publication Data
US 2017/0257800 A1    Sep. 7, 2017

Related U.S. Application Data

(60) Provisional application No. 62/069,497, filed on Oct. 28, 2014.

(51) Int. Cl.
*H04W 36/00* (2009.01)
*H04W 72/10* (2009.01)
(Continued)

(52) U.S. Cl.
CPC ....... *H04W 36/0022* (2013.01); *H04W 72/10* (2013.01); *H04W 76/18* (2018.02); *H04W 76/30* (2018.02); *H04W 60/04* (2013.01)

(58) Field of Classification Search
CPC . H04W 36/0022; H04W 76/30; H04W 72/10; H04W 76/06; H04W 76/18
(Continued)

(56) References Cited

U.S. PATENT DOCUMENTS

| 2012/0302239 A1 | 11/2012 | Hu et al. |
| 2014/0113636 A1 | 4/2014 | Lee et al. |
| 2016/0057682 A1* | 2/2016 | Yang ..................... H04W 36/24 455/436 |

FOREIGN PATENT DOCUMENTS

| CN | 102369739 A | 3/2012 |
| CN | 103391568 A | 11/2013 |

(Continued)

OTHER PUBLICATIONS

International Search Report and the Written Opinion of the International Searching Authority corresponding to Application No. PCT/CN2015/093118; dated Jan. 21, 2016.
(Continued)

*Primary Examiner* — Pao Sinkantarakorn
*Assistant Examiner* — Ellen Kirillova
(74) *Attorney, Agent, or Firm* — Cantor Colburn LLP

(57) ABSTRACT

A user equipment and a circuit-switched fallback method thereof are provided. An initial base station sends a radio resource control connection release message containing the redirection frequency list to the UE. The redirection frequency list includes at least one redirection frequency. The UE determines a priority of the at least one redirection frequency according to a current registered LAI, a learning database and a piece of signal reference information of the redirection frequency list. Accordingly, the UE executes a circuit switch fallback procedure according to the priority of the at least one redirection frequency.

20 Claims, 17 Drawing Sheets

(51) Int. Cl.
  *H04W 76/06* (2009.01)
  *H04W 76/18* (2018.01)
  *H04W 76/30* (2018.01)
  *H04W 60/04* (2009.01)

(58) Field of Classification Search
  USPC .......................................................... 370/331
  See application file for complete search history.

(56) References Cited

FOREIGN PATENT DOCUMENTS

| | | |
|---|---|---|
| CN | 103781084 A | 5/2014 |
| CN | 103781131 A | 5/2014 |

OTHER PUBLICATIONS

SIPO Office Action corresponding to Application No. 201580002972.7; dated Sep. 5, 2018.

* cited by examiner

Current serving cell: 4G ID-m
Redirection list: ARFCN-2, ARFCN-3, ARFCN-4
Current registered LAI: LAI-1

Table 51: Learning database (LD)

| | Association records 31 | |
|---|---|---|
| 4G cell ID-m | ARFCN-1, BSIC-x, LAI-1 | |
| | ARFCN-2, BSIC-y, LAI-2 | |
| | ARFCN-2, BSIC-w, LAI-1 | |
| | ARFCN-3, BSIC-k, LAI-3 | |
| | UARFCN-1, PCI-k, LAI-2 | ⎬ AR51 |
| 4G cell ID-n | ARFCN-1, BSIC-z, LAI-2 | |
| | ARFCN-3, BSIC-z, LAI-1 | |
| | UARFCN-2, PCI-x, LAI-2 | |
| | UARFCN-1, PCI-w, LAI-1 | |

Table 55: Priorities of the redirection frequencies

| Priorities | Classification | RSSI |
|---|---|---|
| ARFCN-1 | High priority | -77dBm |
| ARFCN-2 | Medium priority | -75dBm |
| ARFCN-4 | Medium priority | -80dBm |
| ARFCN-3 | Low priority | -67dBm |

FIG. 5C

Current serving cell: 4G ID-w
Redirection list: ARFCN-1, ARFCN-2, ARFCN-3, ARFCN-4, ARFCN-5
Current registered LAI: LAI-1

Table 63: Priorities of the redirection frequencies

| Priorities | Classificatin | RSSI |
|---|---|---|
| ARFCN-4 | High priority | -60dBm |
| ARFCN-1 | High priority | -77dBm |
| ARFCN-2 | Medium priority | -75dBm |
| ARFCN-5 | Medium priority | -77dBm |
| ARFCN-3 | low priority | -75dBm |

Table 61: Learning database (LD)

| | Association records 31 |
|---|---|
| 4G cell ID-w | ARFCN-1, BSIC-x, LAI-1 |
| | ARFCN-2, BSIC-y, LAI-2 |
| | ARFCN-2, BSIC-w, LAI-1 |
| | ARFCN-3, BSIC-k, LAI-1 |
| | ARFCN-4, BSIC-k, LAI-1 |
| | UARFCN-1, PCI-k, LAI-2 |
| | UARFCN-3, PCI-h, LAI-3 |
| 4G cell ID-x | ARFCN-3, BSIC-z, LAI-1 |
| | UARFCN-2, PCI-x, LAI-2 |
| | UARFCN-1, PCI-w, LAI-1 |

USER EQUIPMENT AND CIRCUIT-SWITCHED FALLBACK METHOD THEREOF

CROSS-REFERENCES TO RELATED APPLICATIONS

This is the U.S. national stage of application No. PCT/CN2015/093118, filed on Oct. 28, 2015. Priority under 35 U.S.C. § 119(a) and 35 U.S.C. § 365(b) is claimed from U.S. Provisional Application Ser. No. 62/069,497 filed on Oct. 28, 2014, the disclosure of which is also incorporated herein by reference.

BACKGROUND OF THE INVENTION

Field of the Invention

The present invention relates to a user equipment (UE) and a circuit-switched fallback (CSFB) method thereof. More particularly, the user equipment of the present invention establishes a learning database dynamically so as to utilize the learning database to determine a priority of the at least one redirection frequency included in a redirection frequency list.

Descriptions of the Related Art

With the development of wireless communication technologies, wireless devices have been widely used. To satisfy users' overwhelming demands for communication, various telecommunication standards have been developed. For example, the long-term evolution (LTE) is one of the most popular telecommunication standards.

The LTE system only provides the packet-switched service for UEs. Under the current telecommunication architecture, when a user wants to use a LTE capable UE to execute a circuit-switched service, the LTE capable UE needs to fall back to another communication system that offers a circuit-switched service (e.g., UMTS) so as to set up a call. However, when the LTE capable UE is handed over from the LTE system to the second generation or third generation (2G/3G) communication system for the circuit-switched service, it may increase a call setup time during the circuit-switched fallback (CSFB) procedure, which is called CSFB latency.

The CSFB latency is mainly caused by a location update and system information reception procedures. More specifically, in case a current location area (LA) where the LTE capable UE is registered is different from a location area to which a 2G/3G target base station belongs during a CSFB procedure, the specification of the LTE system regulates that the LTE capable UE need to perform a location update procedure so that a call setup can be established successfully. However, the extra location update procedure will increase a call setup time, which might degrade user experience. On the other hand, in some communication system architectures, a user would be unable to receive an incoming call if the LTE capable UE is handed over to a 2G/3G target base station that belongs to a different LA and different MSC pool.

Accordingly, an urgent need exists in the art to provide a CSFB mechanism to avoid selecting a base station whose LA is different from the current LA where the LTE capable UE is registered and to reduce the probability of an incoming call failure during a CSFB procedure.

SUMMARY OF THE INVENTION

The objective of the present invention is to provide a CSFB mechanism in which a user equipment (UE) establishes a learning database and utilizes the established learning database to determine priorities of redirection frequencies included in a redirection frequency list. As a consequence, the UE of the present invention is able to enhance the probability of selecting a target base station whose LA is the same as a current registered LA of the UE during a CSFB procedure. Therefore, the UE of the present invention is capable of avoiding CSFB latency and reducing the probability of an incoming call failure.

To achieve the aforesaid objective, the present invention discloses a user equipment which comprises a transceiver, a storage and a processor. The transceiver is configured to receive a radio resource control (RRC) connection release message containing a redirection frequency list from an initial base station, wherein the initial base station provides a packet-switched service, and the redirection frequency list includes at least one redirection frequency. The storage is configured to store a learning database, a current registered local area identity (LAI) and a piece of signal reference information of the redirection frequency list. The processor is electrically connected to the storage and the transceiver and configured to determine a priority of the at least one redirection frequency according to the current registered LAI, the learning database and a piece of signal reference information of the redirection frequency list, and to execute a circuit switch fallback (CSFB) procedure according to the priority of the at least one redirection frequency.

In addition, the present invention further discloses a circuit switch fallback (CSFB) method for use in a user equipment. The user equipment comprises a transceiver, a storage and a processor. The transceiver is configured to receive a radio resource control (RRC) connection release message containing a redirection frequency list from an initial base station. The initial base station provides a packet-switched service, and the redirection frequency list includes at least one redirection frequency. The storage is configured to store a learning database, a current registered local area identity (LAI) and a piece of signal reference information of the redirection frequency list. The processor is electrically connected to the storage and the transceiver. The CSFB method is executed by the processor and comprises the following steps: determining a priority of the at least one redirection frequency according to the current registered LAI, the learning database and a piece of signal reference information of the redirection frequency list; and executing a circuit switch fallback (CSFB) procedure according to the priority of the at least one redirection frequency.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIGS. 5B-5C are schematic diagrams illustrating how redirection frequencies are prioritized according to the fourth embodiment of the present invention;

FIG. 6A is a schematic diagram illustrating how redirection frequencies are prioritized according to the fourth to fifth embodiments of the present invention;

DESCRIPTION OF THE PREFERRED EMBODIMENT

The present invention provides a user equipment (UE) and a circuit-switched fallback (CSFB) method thereof. In the following description, the present invention will be explained with reference to embodiments thereof. It shall be appreciated that, theses embodiments of the present invention are not intended to limit the present invention to any specific environment, applications or implementations described in these embodiments. Therefore, the description of these embodiments is only for purpose of illustration rather than to limit the present invention and the scope claimed in this application shall be governed by the claims. Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1:
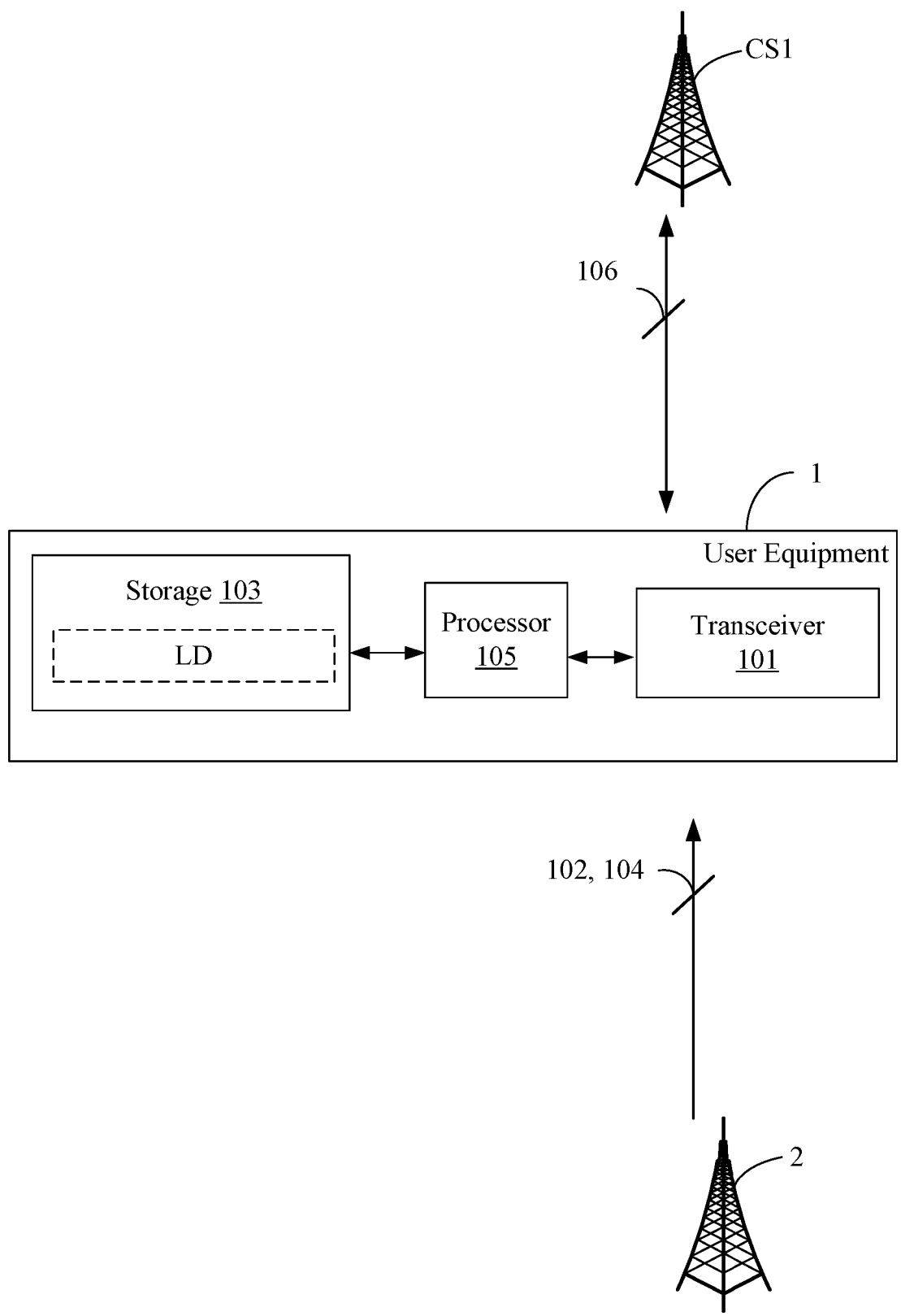
FIG. 1 is a schematic view of a user equipment 1 according to the first embodiment to the sixth embodiment of the present invention.
Figure 2:
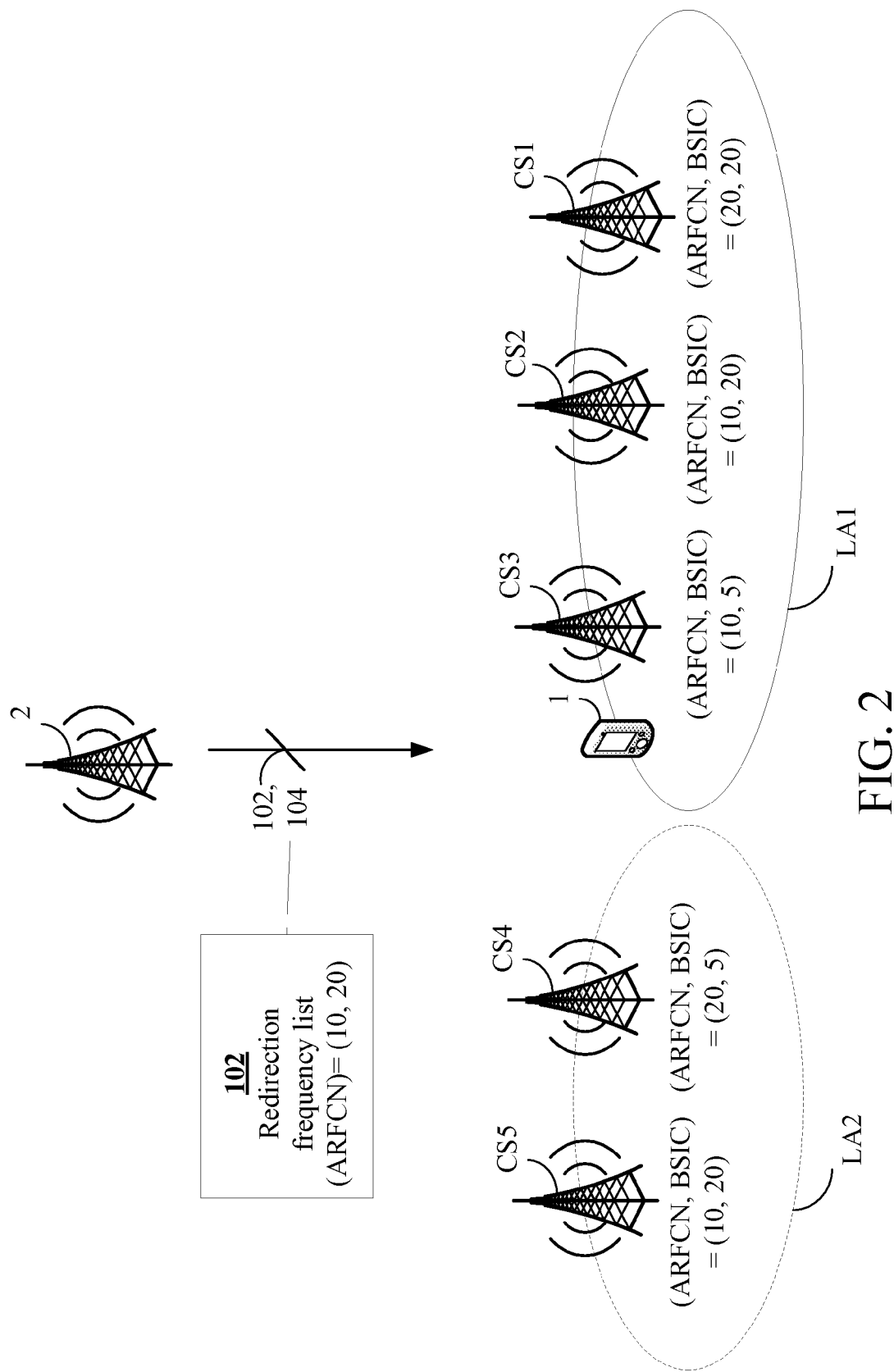
FIG. 2 depicts a scenario according to the first and second embodiments of the present invention.

FIGS. 1 and 2 illustrate the first embodiment of the present invention. FIG. 1 is a schematic diagram of a UE 1 of the present invention. The UE 1 may be a smart phone, a tablet computer, or any other device with communication capability. It shall be noted that for the purpose of simplicity, other elements of the UE 1, such as a display module, an antenna module, a power module and elements less related to the present invention, are all omitted from depiction herein.

The UE 1 comprises a transceiver 101, a storage 103 and a processor 105 electrically connected to the transceiver 101 and the storage 103. In the present invention, the UE 1 communicates with a base station 2, which only offers the packet service (e.g., the base station 2 conforms to a long-term evolution (LTE) system or other communication system which provides the packet service). Specifically, the UE 1 is able to execute various kinds of services (e.g., accessing an e-mail server) via the base station 2. The base station 2 that provides the packet-switched service does not support circuit-switched calls. Therefore, the base station 2 would request the UE 1 to hand over to another base station (e.g., base station CS1), which provides a circuit-switched service, when the UE 1 requests the base station 2 to perform a circuit-switched service.

In the redirection based CSFB procedure, the transceiver 101 would receive a radio resource control (RRC) connection release message 102 that contains a redirection frequency list from the base station 2 (i.e., the term "initial base station" recited in claims of the present invention). As aforementioned, base station 2 may conform to the LTE system, which means that the base station 2 only provides a packet-switched service. Under the circumstance, when a user desires to utilize the UE 1 perform a circuit-switched service (e.g., answer an incoming call or make a call), the UE 1 needs to perform a circuit-switched fallback (CSFB) procedure where the UE 1 would be handed over from the base station 2 to another base station (e.g., base station CS1) that provides a circuit-switched service.

The redirection frequency list transmitted from the base station 2 includes at least one redirection frequency. For example, as shown in FIG. 2, the redirection frequency list carried in the RRC connection release message 102 includes the absolute radio frequency channel number (ARFCN) 10 and the ARFCN 20. It shall be noted that, there are two redirection frequencies ARFCN 10 and the ARFCN 20 included in the redirection frequency in this embodiment; however, the number of the redirection frequency included in the redirection frequency list depends on a configuration result from a core network and thus it is not limited to two as illustrated in FIG. 2. That is, the number of the redirection frequency included in the redirection frequency list may be only one, five, or any other number.

Besides, ARFCNs are channel numbers which indicate a specific frequency band respectively for the second generation (2G) communication system. In another exemplary embodiment, the redirection frequency included in the redirection frequency list may be UMTS terrestrial radio access absolute radio frequency channel numbers (UARFCNs) for the third generation (3G) communication system instead of ARFCNs. Likewise, the type of the redirection frequencies (i.e., whether the redirection frequencies are UARFCNs or ARFCNs) included in the redirection frequency list depends on a configuration result from a core network (which is not shown here).

The storage 103 is configured to store a learning database LD, a piece of signal reference information of the redirection frequency list and a current registered local area identity (LAI). It shall be appreciated that, the storage 103 may be a tangible machine-readable medium or a combination of multiple tangible machine-readable medium, such as a flash memory, a hard disk, or any other storage media with the same function and well known to those skilled in the art. In detail, information about base stations (e.g., base stations 2, CS1) is recorded in the learning database LD during a learning process. And, information on the current registered LAI can be obtained from the base station 2 when the UE 1 is connected to the base station 2. For example, the UE 1 can obtain the information about the current registered LAI in a combined attach or combined tracking area update (TAU) result. Since those of ordinary skill in the art have appreciated how the UE 1 can obtain the information about the current registered LAI from a packet-switched based base station (e.g., base station 2), the detail will be omitted from description herein.

The processor 105 is electrically connected to the transceiver 101 and the storage 103 and configured to determine a priority of the at least one redirection frequency according to the current registered LAI, the learning database LD and the piece of signal reference information of the redirection frequency list. In the redirection based CSFB procedure, since the base station 2 only provides redirection frequencies (i.e., ARFCN 10 and the ARFCN 20) for the UE 1, the UE 1 is unable to acquire related information of the redirection frequencies of target base stations (e.g., a LAI of a target base station at a redirection frequency). Nonetheless, the UE 1 of the present invention can predict related information of the redirection frequencies ARFCN 10 and the ARFCN 20 according to the learning database. Thus, the present invention allows the UE 1 to prioritize the redirection frequencies so as to enhance the possibility of selecting a proper target base station at a redirection frequency whose LAI is the same as the current registered LAI. In this way, the present invention can avoid performing the location update procedure; consequently, the UE 1 of the present invention provides a better user experience for users.

In other words, the UE 1 of the present invention can utilize the information on the current registered LAI, the learning database established and stored in the UE 1, and a piece of signal reference information of the redirection frequency list to determine priorities of the redirection frequencies ARFCN 10 and ARFCN 20 illustrated in FIG. 2. To be more specific, the processor 105 can measure a received signal reference at each of the redirection frequencies ARFCN 10 and ARFCN 20 via the transceiver 101. In this way, the signal reference information can be generated according to the measured received signal reference at each of the at least one redirection frequency. In other implementations, the UE 1 may obtain the signal reference information through various ways. It is noted that the "signal reference" described herein can be a signal strength, a signal quality, etc. Accordingly, the processor 105 executes a circuit switch fallback (CSFB) procedure according to the priorities of the redirection frequencies ARFCN 10 and ARFCN 20.

The second embodiment of the present invention is an extension of the first embodiment and it is also depicted in FIGS. 1 and 2. In this embodiment, the processor 105 further determines the priority of the at least one redirection frequency according to a signal reference threshold. In other words, the processor 105 determines the priority of the at least one redirection frequency based on the current registered LAI, the learning database LD, the piece of signal reference information of the redirection frequency list and the signal reference threshold. It shall be noted that the signal reference threshold may be a default setting and could be adjusted according to different usage conditions. For example, if the UE 1 is in a high mobility (e.g., the user of the UE 1 is on a high speed rail), the signal reference threshold would be adjusted to a higher threshold so as to maintain a better quality of service.

As shown in FIGS. 1 and 2, the transceiver 101 may further receive a high speed flag information 104 from the base station 2 when the UE 1 is in a high mobility. More specifically, the high speed flag information 104 can be carried in physical random access channel configuration information (PRACH—Configinfo). The processor 105 further adjusts the signal reference threshold after receiving the high speed flag information 104. In this way, the UE 1 of the present invention can determine the priorities of redirection frequencies ARFCN 10 and ARFCN 20 further based on the adjusted signal reference threshold. Consequently, the UE 1 of the present invention is able to select a suitable base station whose signal reference is higher enough to keep a better quality of service during a trip on the high speed rail. That is, a base station whose signal reference is higher than the signal reference threshold may be determined to be a higher priority.

Figure 3:
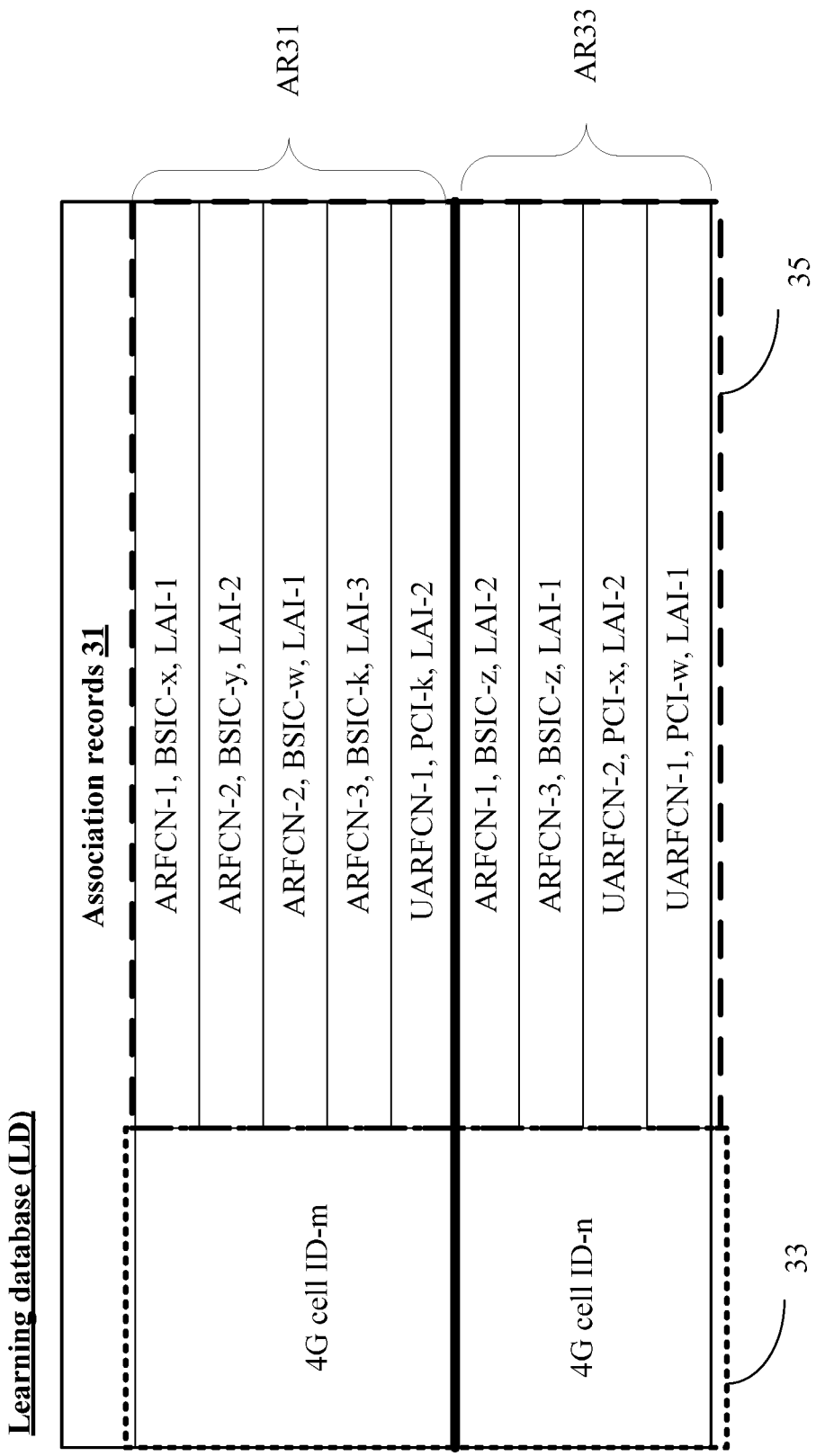
FIG. 3 is a table showing association records 31 stored in the learning database LD according to the third embodiment of the present invention.
Figure 4:
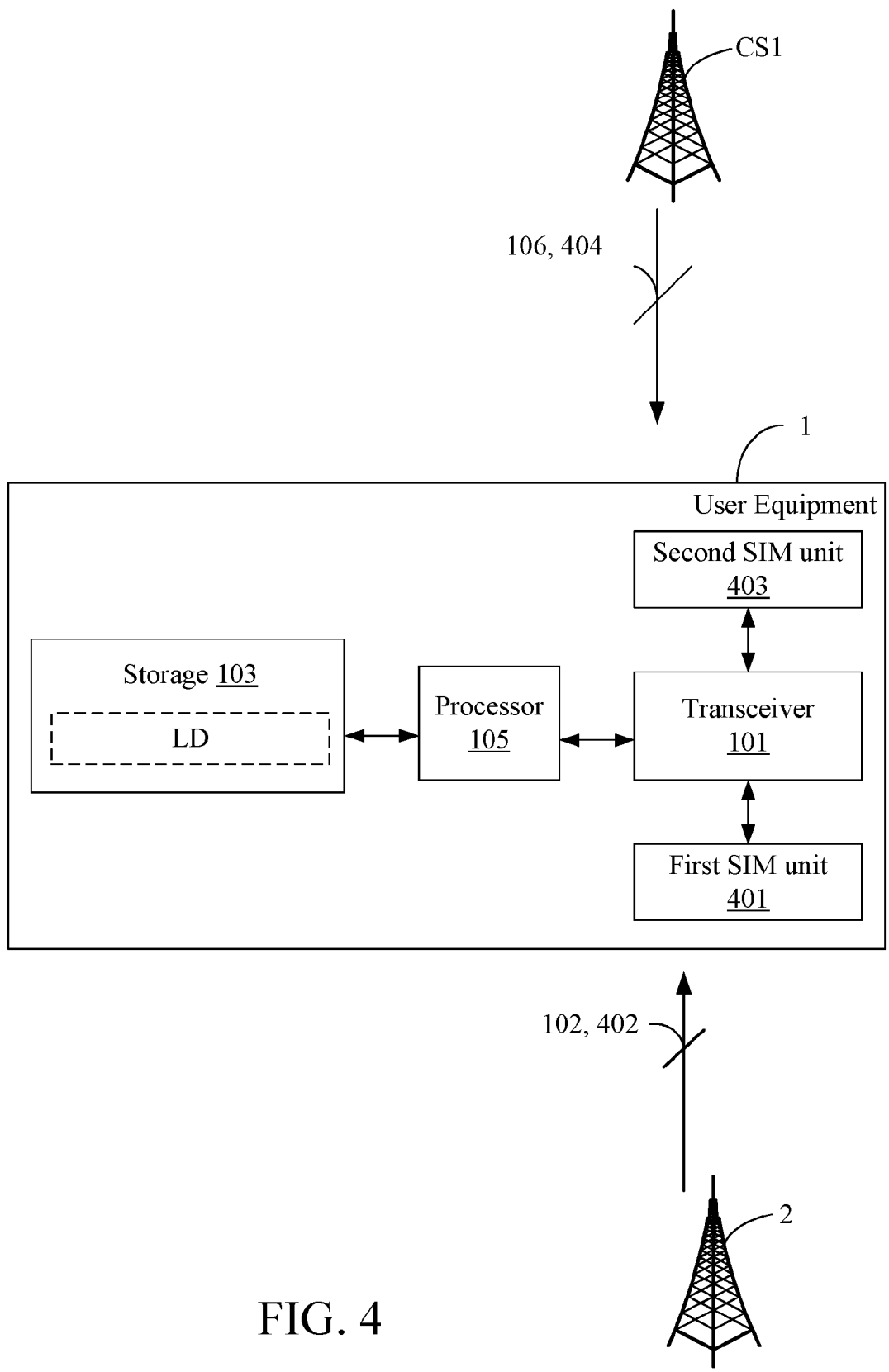
FIG. 4 is a schematic view of a user equipment 1 according to the third embodiment of the present invention.

Please refer to FIGS. 3-4 for the third embodiment of the present invention. As shown in FIG. 3, the learning database LD further includes association records 31. It shall be noted that the number of the association records 31 depends on each learning process and would be updated dynamically every time the learning process is executed. In this embodiment, for ease of illustrating, there are only two association records AR31 and AR 33 shown herein.

Each of the association records 31 is an association between a first type base station which provides a packet-switched service (e.g., 4G base station, which may conform to the LTE system) and a second type base station (e.g., 2G/3G base station) which provides a circuit-switched service and a packet-switched service. In detail, each of the association records 31 includes an identity of the first type base station 33 (e.g., ID-m) and at least one second type base station information set 35 (e.g., ARFCN-1, BSIC-x, LAI-1). For example, an identity of the first type base station included in the association record AR31 is ID-m of the 4G cell, while an identity of the first type base station included in the association record AR33 is ID-n of the 4G cell.

In addition, the association record AR31 includes five second type base station information sets, and the association record AR33 includes four second type base station information sets. Moreover, each of the at least one second type base station information set 35 includes a radio frequency channel number (e.g., ARFCN-1), an identity of the second type base station (e.g., BSIC-x) and a location area identity (LAI) (e.g., LAI-1).

As described previously, the learning database LD is established and stored by the UE 1 during a learning process. To be more specific, in the beginning before an initial learning process, there is no data stored in the learning database LD. Once the UE 1 of the present invention detects or communicates with a base station, the UE 1 would learn and store information about the base station and its adjacent base stations during the learning process. In detail, the transceiver 101 is further configured to receive first learning information in an initial inter radio access technology (RAT) procedure. It shall be noted that the "initial inter RAT procedure" described herein means that it is the first time that the UE 1 executes the inter RAT procedure. Besides, the inter RAT procedure can be, for example, a circuit-switched fall back procedure, a cell reselection and so on.

After receiving the first learning information in the initial inter RAT procedure, the storage 103 further stores the first learning information into one association record. As a consequence, the processor 105 establishes the learning database LD based on the one association record. Next time, when the UE 1 of the present executes the inter RAT procedure again, the UE 1 will receive another learning information (it is referred to as "second learning information" hereinafter). Accordingly, the storage 103 further stores the second learning information into the learning database LD. In other words, the processor 105 would further update the learning database LD once another inter RAT procedure has been executed.

As aforementioned, the learning information (e.g., the first learning information, or the second learning information) stored in the one association record may include an identity of a first type base station and at least one second type base station information set. The first type base station provides a packet-switched service (e.g., 4G base station), and the second type base station provides a circuit-switched service and a packet-switched service (e.g., 2G/3G base station). And, the at least one second type base station information set may include a radio frequency channel number, an identity of a second type base station and a location area identity (LAI). It shall be appreciated that the present invention is not intended to limit the content included in the learning information and the learning database LD. That is, apart from the association records, the learning database LD can include other types of learning information. Moreover, the learning information stored in one association record may include other more information (e.g., information about a mobile switching center (MSC) pool of a 2G/3G base station).

In addition, in other embodiments, the UE 1 of the present invention can further obtain the learning information by retrieving information from multiple subscriber identity module (SIM) units. As illustrated in FIG. 4, the transceiver 101 is further configured to electrically connect to a first subscriber identity module (SIM) unit 401 and a second SIM unit 403. Therefore, the transceiver 101 can be connected to two base stations simultaneously. More specifically, the transceiver 101 is further connected to a first type base station (e.g., base station 2) that provides the packaged-switched service via the first SIM unit 401 and also connected to a second type base station (e.g., base station CS1) that provides a circuit-switched service and a packet-switched service via the second SIM unit 403. The processor 105 further retrieves first connection information 402 from the first SIM unit 401 and second connection information 404 from the second SIM unit 403 so as to enable the storage 103 to store an association record of the first connection information 402 and the second connection information 404 into the learning database LD.

It is noted that, when the UE 1 is connected to the base station 2 via the first SIM unit 401, the UE 1 can receive the first connection information 402 which includes an identity of the base station 2 from the base station 2. Likewise, when the UE 1 is connected to the base station CS1 via the second SIM unit 403, the UE 1 can receive the second connection information 404 which includes an identity of the base station CS1, a LAI of the base station CS1 and so forth from the base station CS1. In other words, the learning information stored in the learning database LD can be obtained in various ways, including via the multiple SIM units configured in the UE 1 and via the inter RAT procedure, but not limit to the ways described herein.

Figure 5A:
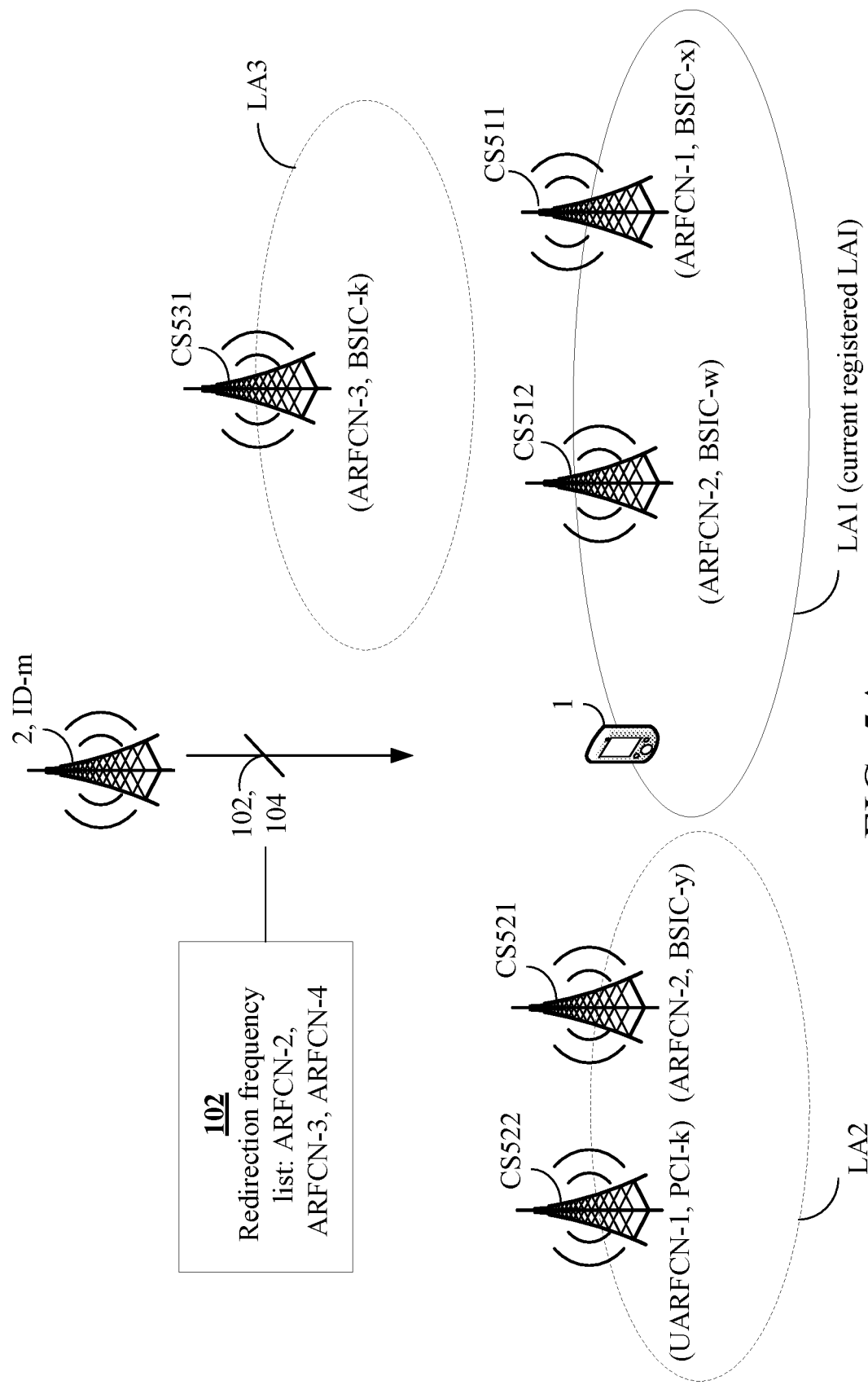
FIG. 5A depicts a scenario illustrating the redirection frequency list sent from the base station 2 with identity ID-m according to the fourth embodiment of the present invention.
Figure 5B:
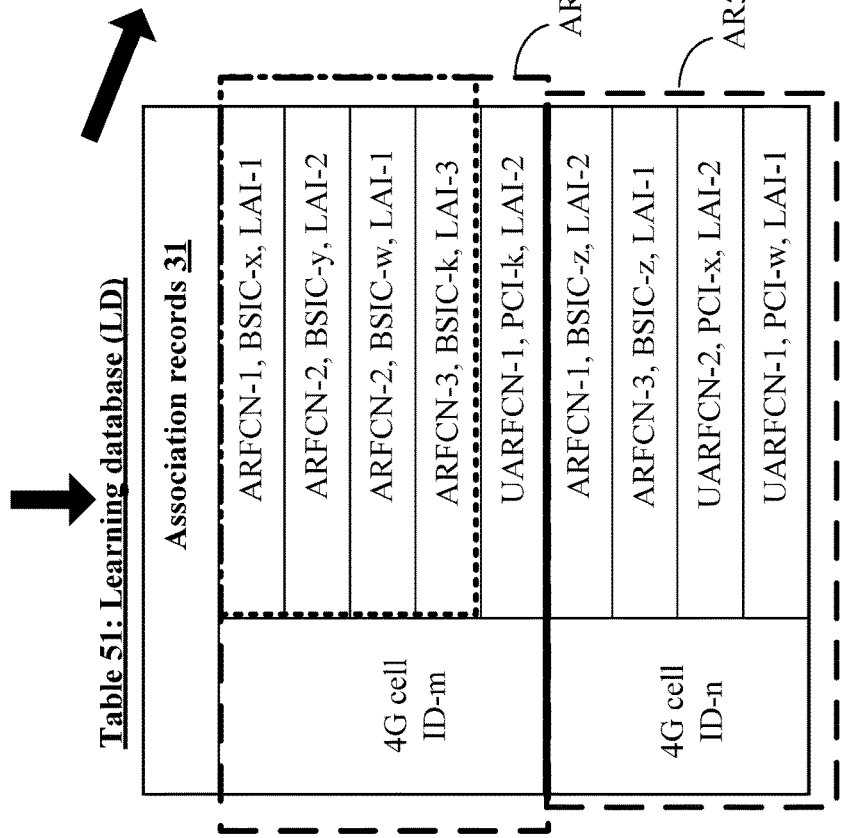

The fourth embodiment of the present invention is shown in FIGS. 1, 5A-5C and 6A. As shown in FIG. 5A and FIG. 5B, the UE 1 is able to obtain an identity (i.e., ID-m) of the base station 2 when the UE 1 is connected to the base station 2, which provides only the packet-switched service (e.g., the base station 2 conforms to the LTE system). When the UE 1 requests the base station 2 to execute a circuit-switched service, the base station 2 would transmit a redirection frequency list included in the RRC connection release message 102 to the UE 1. The redirection frequency list includes ARFCN-2, ARFCN-3, ARFCN-4. It should be understood that, in this embodiment, the base station 2 selects base stations which conform to 2G system via the core network to constitute the redirection frequency list (i.e., ARFCN-2, ARFCN-3, ARFCN-4). However, in other embodiments, the redirection frequencies included in the redirection frequency list may be selected from 3G based base stations. The exemplary embodiment shown herein is only for ease of understanding, but not for limiting the present invention.

Specifically, as aforesaid, the transceiver 101 receives an identity (i.e., ID-m) of the base station 2 (i.e., the "the initial base station" recited in claims of the present invention) from the base station 2. Once the transceiver 101 further receives the redirection frequency list from the base station 2, the processor 105 would further determine the priorities of the redirection frequencies ARFCN-2, ARFCN-3, ARFCN-4 based on the following description. First, the processor 105 determines whether the identity of the base station 2 (i.e., ID-m) that sends the redirection frequency list matches one of the identities of the first type base station (i.e., 4G based base station illustrated in FIG. 5B) stored in each of the association records. For example, as shown in FIG. 5B, there are two association records AR51, AR53 included in the learning database LD. It should be appreciated that learning database LD may include other association records. For ease of illustrating, only two association records AR51, AR53 are shown herein.

In this case, the identity of the base station 2 (i.e., ID-m) is included in the association record AR51. Therefore, the processor 105 can select a matching association record (i.e., the association record AR51) from the association records when the identity of the first type base station (i.e., ID-m) stored in the matching association record AR51 matches the identity ID-m of the base station 2. It is appreciated that the "matching association record" described herein means an association record included in the association records and in which the stored identity of the first type base station matches the packet-switched based base station (e.g., 4G cell) to which the UE 1 is currently connected. Consequently, the processor 105 uses the matching association record AR51 to determine the priorities of the redirection frequencies ARFCN-2, ARFCN-3, ARFCN-4.

Moreover, for each of the at least one redirection frequency, the processor 105 further executes the following steps: classifying the at least one redirection frequency into a high priority list, a medium priority list and a low priority list respectively according to the matching association record; and determining the priority of the at least one redirection frequency as the following order: the high priority list, the medium priority list, the low priority list. Taking FIG. 5A as an example, for each of the redirection frequencies ARFCN-2, ARFCN-3, ARFCN-4, the processor 105 would classify the redirection frequencies ARFCN-2, ARFCN-3, ARFCN-4 into a high priority list, a medium priority list and a low priority list respectively according to the matching association record AR51. The redirection frequency which has been classified into a high priority list would be ordered in a high priority in the redirection frequency list, while the redirection frequency which has been classified into a low priority would be ordered in a low priority in the redirection frequency list. And, the priority of the redirection frequency which has been classified into a medium priority list would be between the high priority and the low priority.

More specifically, for each of redirection frequencies (e.g., ARFCN-2, ARFCN-3, ARFCN-4 shown in FIG. 5A) included in the redirection frequency list, the processor 105 further determines whether the redirection frequency matches at least one of the at least one radio frequency channel number stored in the matching association record (e.g., ARFCN-1, ARFCN-2, ARFCN-2, ARFCN-3, UARFCN-1 stored in the association record AR51 of FIG. 5B). Then, the processor 105 classifies the redirection frequency into one of the high priority list and the low priority list according to the following criteria: (a8) the redirection frequency matches at least one of the at least one radio frequency channel number stored in the matching association record; (b8) the LAI which corresponds to each of the at least one matched radio frequency channel number and which is stored in the matching association record is the same as the current registered LAI; and (c8) the received signal reference at the redirection frequency is higher than a first threshold. The processor 105 classifies the redirection frequency into the high priority list when all of the above criteria (a8), (b8) and (c8) are satisfied. Otherwise, the processor 105 classifies the redirection frequency into the low priority list when only criteria (a8) and (b8) are satisfied. In addition, the processor 105 further orders the at least one redirection frequency which has been classified into the high priority list according to the received signal reference of each of the at least one redirection frequency.

Furthermore, the processor 105 may further classify the redirection frequency into the low priority list when the following criteria are satisfied: the redirection frequency matches at least one of the at least one radio frequency channel number stored in the matching association record; and the LAI which corresponds to each of the at least one matched radio frequency channel number and which is stored in the matching association record is different from the current registered LAI.

Moreover, the processor 105 may further classify the redirection frequency into one of the medium priority list and the low priority list according to the following criteria: (a12) the redirection frequency does not match any of the at least one radio frequency channel number stored in the matching association record, or the redirection frequency matches more than one of the at least one radio frequency channel number stored in the matching association record and not all of the LAIs that correspond to the matched radio frequency channel numbers are the same as the current registered LAI; and (b12) the received signal reference of the redirection frequency is higher than a second threshold.

The processor 105 classifies the redirection frequency into the medium priority list when all of the above criteria (a12) and (b12) are satisfied. Otherwise, the processor 105 classifies the redirection frequency into the low priority list when only the criterion (a12) is satisfied. It should be noted that the first threshold can be the same as/different from the second threshold. According to the learning information (i.e., information about radio frequency channel numbers and LAIs recorded on association records), the UE 1 of the present invention is capable of predicting a LAI of a target base station at a redirection frequency. In other words, taking redirection to 2G as an example, a predictive LAI of a target base station at the redirection frequency is determined based on the corresponding LAI of the matched radio frequency channel numbers before receiving any system information on any target base. Accordingly, the redirection frequencies whose corresponding predictive LAIs are the same as the current registered LAI would be classified into the high priority list, while the redirection frequencies whose corresponding predictive LAIs are different from the current registered LAI would be classified into the low priority list. And, the redirection frequencies whose corresponding predictive LAIs cannot be determined would be classified into the medium list.

For example, as shown in FIG. 5B, the processor 105 would further classify each of the redirection frequencies ARFCN-2, ARFCN-3, ARFCN-4 into one of the high priority list, medium priority list and the low priority list, respectively. It is assumed that both the first threshold and the second threshold are set to −90dBm RSSI. For the redirection frequency ARFCN-2, there are two second type base station information sets both of which record the same radio frequency channel number ARFCN-2. One second type base station information set records the radio frequency channel number ARFCN-2, an identity BSIC-y of the second type base station, and its corresponding LAI LAI-2. The other second type base station information set records the radio frequency channel number ARFCN-2, an identity BSIC-w of the second type base station, and its corresponding LAI LAI-1. In this case, the UE 1 of the present invention is unable to determine the predictive LAI of the redirection frequency ARFCN-2 since there are two matched radio frequency channel numbers ARFCN-2 whose corresponding LAIs (i.e., LAI-2 and LAI-1) are not all the same as the current registered LAI (i.e., LAI-1). Besides, the signal reference at the redirection frequency ARFCN-2 measured by the UE 1 is −75dBm, which is higher than the second threshold. As a result, the redirection frequency ARFCN-2 would be classified into the medium priority list.

For the redirection frequency ARFCN-3, there is only one second type base station information set in which the radio frequency channel number ARFCN-3 matches the redirection frequency ARFCN-3. The matched second type base station information set records the radio frequency channel number ARFCN-3, an identity BSIC-k of the second type base station, and its corresponding LAI LAI-3. In this case, the UE 1 of the present invention would classify the redirection frequency ARFCN-3 into the low priority list since the corresponding LAI (i.e., LAI-3) of the matched radio frequency channel number ARFCN-3 recorded in the matching association record is different from the current registered LAI (i.e., LAI-1). On the other hand, for the redirection frequency ARFCN-4, there is no second type base station information set in which the radio frequency channel number matches the redirection frequency ARFCN-4. In this case, the UE 1 of the present invention classifies the redirection frequency ARFCN-4 into the medium priority list since the UE 1 is unable to determine the predictive LAI of the target base station at the redirection frequency ARFCN-4 and the signal reference (i.e., −80dBm) at the redirection frequency ARFCN-4 is higher than the second threshold.

Moreover, the UE 1 can further determine the priority order of the redirection frequencies ARFCN-2 and ARFCN-4 which have been classified into the medium priority list according to the signal reference measured at the redirection frequencies ARFCN-2 and ARFCN-4. Specifically, the redirection frequency at which the signal reference is measured higher would be ordered in a higher priority. Conversely, the redirection frequency at which the signal reference is measured lower would be ordered in a lower priority. Hence, in this case, the redirection frequencies ARFCN-2 (whose corresponding RSSI is −75dBm) and ARFCN-4 (whose corresponding RSSI is −80dBm) are ordered in the first and second priority, respectively, and the redirection frequencies ARFCN-3 are ordered in the third priority (i.e., the lowest priority).

FIG. 6A shows another exemplary embodiment. As shown in FIG. 6A, the UE 1 is connected to a serving 4G-based base station whose identity is ID-w. The serving 4G-based base station sends the redirection frequency list that contains ARFCN-1, ARFCN-2, ARFCN-3, ARFCN-4, ARFCN-5 to the UE 1. Likewise, the UE 1 would select a matching association record AR61 from the association records 31. The identity (i.e., ID-w) of the first type base station included in the matching association record AR61 matches the identity (i.e., ID-w) of the serving 4G-based base station. Then, the UE 1 would further determine the priorities of the redirection frequencies ARFCN-1, ARFCN-2, ARFCN-3, ARFCN-4, ARFCN-5 based on the matching association record AR61.

For the redirection frequency ARFCN-1, there is only one second type base station information set in which the radio frequency channel number ARFCN-1 matches the redirection frequency ARFCN-1. The matched second type base station information set records the radio frequency channel number ARFCN-1, an identity BSIC-x of the second type base station, and its corresponding LAI LAI-1. In this case, the UE 1 of the present invention would classify the redirection frequency ARFCN-1 into the high priority list since the corresponding LAI (i.e., LAI-1) of the matched radio frequency channel number ARFCN-1 recorded in the matching association record AR61 is the same as the current registered LAI (i.e., LAI-1) and the measured RSSI at the redirection frequency ARFCN-1 is −77 dBm, which is higher than the first threshold (i.e., −90dBm).

For the redirection frequency ARFCN-4, there is only one second type base station information set in which the radio frequency channel number ARFCN-4 matches the redirection frequency ARFCN-4. The matched second type base station information set records the radio frequency channel number ARFCN-4, an identity BSIC-k of the second type base station, and its corresponding LAI LAI-1. In this case, the UE 1 of the present invention would classify the redirection frequency ARFCN-4 into the high priority list since the corresponding LAI (i.e., LAI-1) of the matched radio frequency channel number ARFCN-4 recorded in the matching association record AR61 is the same as the current registered LAI (i.e., LAI-1) and the measured RSSI at the redirection frequency ARFCN-4 is −60dBm, which is higher than the first threshold (i.e., −90dBm).

Then, the UE 1 of the present invention would classify the redirection frequencies ARFCN-2 and ARFCN-5 into the medium priority list since the UE 1 is unable to determine what their corresponding predictive LAIs are in this case. Specifically, the redirection frequency ARFCN-2 matches more than one of radio frequency channel numbers stored in the matching association record AR61 (i.e., there are two second type base station information sets in which their radio frequency channel numbers ARFCN-2 match the redirection frequency ARFCN-2) and not all of the LAIs (i.e., one corresponding LAI is LAI-2, the other is LAI-1) that correspond to the matched radio frequency channel numbers ARFCN-2 are the same as the current registered LAI (i.e., LAI-1).

On the other hand, the redirection frequency ARFCN-5 does not match any of radio frequency channel numbers stored in the matching association record AR61. In addition, the received signal reference at the redirection frequency ARFCN-2 (i.e., −75dBm) and the received signal reference at the redirection frequency ARFCN-5 (i.e., −77dBm) are both higher than the second threshold (i.e., −90dBm).

The redirection frequency ARFCN-3 would be classified into the low priority list since the redirection frequency ARFCN-3 matches one of radio frequency channel numbers stored in the matching association record AR61 and the LAI (i.e., LAI-3) which corresponds to the matched radio frequency channel number ARFCN-3 and which is stored in the matching association record AR61 is different from the current registered LAI (i.e., LAI-1). In this case, the corresponding LAI (i.e., LAI-3) of the matched radio frequency channel number ARFCN-3 is different from the current registered LAI (i.e., LAI-1), which means that the corresponding predictive LAI of the redirection frequency ARFCN-3 is different from the current registered LAI.

Therefore, the UE 1 of the present invention is able to order the redirection frequency ARFCN-3 whose corresponding predictive LAI is different from the current registered LAI in the lower priority. In this way, the UE 1 of the present invention can avoid selecting the target base station at the redirection frequency ARFCN-3 to reduce the possibility of performing location update procedure. Besides, as aforementioned, the redirection frequencies which have been classified into the high priority list would be ordered based on their corresponding received signal reference (e.g., RSSI illustrated in FIG. 6A). Similarly, the redirection frequencies which have been classified into the medium priority list/low priority list would be ordered respectively based on their corresponding received signal reference.

Consequently, the redirection frequency ARFCN-4 which has been classified into the high priority list and whose corresponding RSSI is higher than that of the ARFCN-1 would further be ordered in the highest priority. Then, the redirection frequency ARFCN-1 would be ordered in the second priority. Next, the redirection frequencies ARFCN-2 and ARFCN-5 which have been classified into the medium priority list would be ordered in the third priority and the fourth priority respectively. Finally, the redirection frequency ARFCN-3 which has been classified into the low priority list would be ordered in the fifth priority.

In shall be noted that, even though the corresponding RSSI (i.e., −75dBm) of the redirection frequencies ARFCN-2 is higher than that of the redirection frequencies ARFCN-1 (i.e., −77dBm), the redirection frequencies ARFCN-2 is ordered in the lower priority than the redirection frequencies ARFCN-1. This is because the redirection frequencies ARFCN-1 is classified into the high priority list, while the redirection frequencies ARFCN-2 is ordered in the medium priority list. In other words, in this embodiment, how the priorities of the redirection frequencies are determined mainly depends on the priority list (i.e., high priority list, medium priority list or low priority list). If there are more than one redirection frequency classified in the same priority list, the UE 1 of the present invention would further order theses redirection frequencies classified in the same priority list based on the received signal reference (e.g., RSSI).

It shall be noted that, the first threshold and the second threshold can be adjusted when the UE 1 receives a high speed flag information 104 from the base station 2. In addition, the present invention is not intended to limit the criteria for determining which priority list the redirection frequency is classified into. For example, the criteria for determining whether a redirection frequency should be classified into the high priority list may not include the following condition: the received signal reference at the redirection frequency is higher than a first threshold. Similarly, the criteria for determining whether a redirection frequency should be classified into the medium priority list may not include the following condition: the received signal reference at the redirection frequency is higher than a second threshold.

In another scenario, the UE 1 of the present invention may receive the redirection frequency list which comprises only one redirection frequency when the base station 2 sends the redirection frequency list that conforms to the 3G communication system to the UE 1. In this case, the UE 1 may further detect target base stations at the redirection frequency. Accordingly, the UE 1 is able to select a proper target base station at the redirection frequency to execute a CSFB procedure based on the learning database LD. Specifically, the UE 1 can acquire identities of each of target base stations (e.g., PCI-x, PCI-y) at the redirection frequency so as to select a proper target base station further according to the identities of the detected target base stations (i.e., physical cell identity PCI of a target base station).

In another embodiment, each of the at least one second type base station information set 35 may further include mobile switching center (MSC) pool information (which is not shown herein). In detail, when the UE 1 fails to answer an incoming phone after executing a mobile terminated (MT) CSFB procedure, the UE 1 would record that the MSC pool which the current registered LAI belongs to is different from the MSC pool which the previously registered LAI belongs to. In this way, the MSC pool information is recorded during the learning process.

The UE 1 would further determine whether the CSFB procedure is initiated for answering an incoming call, and the processor 105 of the UE 1 would further classify a redirection frequency into a lowest priority list when a predictive MSC pool of the redirection frequency may be different from a current MSC pool corresponding to the current registered LAI used by the user equipment. It is appreciated that, according to the MSC pool information, the UE 1 of the present invention is capable of predicting whether a MSC pool of a target base station at a redirection frequency is the same as the MSC pool of the current registered LAI. In other words, a predictive MSC pool of a target base station at the redirection frequency is determined based on the corresponding the MSC pool information of the matched radio frequency channel numbers. Accordingly, the redirection frequencies whose corresponding predictive MSC pools are different from that of the current registered LAI would be classified into the lowest priority list.

Furthermore, in other embodiments, when there is no redirection frequency which has been classified into the high priority list, the processor 105 can further add additional redirection frequency into the redirection frequency list according to the learning database LD. As shown in FIG. 5C, the redirection frequency list sent from the 4G-based base station only comprises the redirection frequency ARFCN-2, ARFCN-3, ARFCN-4. In this case, since there is no redirection frequency which has been classified into the high priority list, the UE 1 of the present invention is able to add the redirection frequency ARFCN-1, which is classified into the high priority list, into the redirection frequency list. Therefore, the UE 1 can try to select the target base station at redirection frequency ARFCN-1 to set up a circuit-switched service even though the network does not configure the redirection frequency ARFCN-1 to the UE 1.

The fifth embodiment of the present invention is an extension of the fourth embodiment and. After selecting a target base station at the redirection frequency based on the description in the fourth embodiment, the UE 1 further decodes an identity of the target base station that provides a circuit-switched service and receives system information of the target base station. Therefore, the UE 1 is able to initiate an initial access request for the circuit-switched service.

Specifically, as shown in FIG. 1, the processor 105 further decodes an identity of a target base station at a corresponding redirection frequency according to the priority of the at least one redirection frequency. Then, the processor 105 enables the transceiver 101 to receive system information 106 of the target base station (e.g., base station CS1) when the identity of the target base station has been decoded successfully. For example, as illustrated in FIG. 6A, since the redirection frequency ARFCN-4 is ordered in the first priority, the UE 1 would select the target base station at the redirection frequency ARFCN-4 to set up a circuit-switched service. Hence, the processor 105 would decode an identity of the target base station at the redirection frequency ARFCN-4, and enables the transceiver 101 to receive system information of the target base station once the identity of the target base station has been decoded successfully.

It should be noted that, in this embodiment, the UE 1 may select the next priority of the redirection frequency ARFCN-1 to set up a circuit-switched service if the identity of the target base station at the redirection frequency ARFCN-4 has not been decoded successfully. No matter whether the decoded result at the redirection frequency ARFCN-4 is the same as the predictive identity (i.e., BSIC-k) or not, the UE 1 would receive the system information from that target base station and initiate an initial access request for the circuit-switched service accordingly. However, in another embodiment, the UE 1 would select a target base station at a redirection frequency which has been classified into the high priority list and whose identity decoding result is the same as the predictive identity.

To be more specific, the processor 105 further executes the following operations: decoding an identity of a target base station at a corresponding redirection frequency which has been determined to be the high priority list according to the priority of the at least one redirection frequency; determining whether a decoding result of the identity of the target base station matches one of at least one predictive identity or not; enabling the transceiver 101 to receive system information of the target base station when the decoding result of the identity of the target base station matches one of the at least one predictive identity.

On the other hand, the processor 105 would further execute the following operations when the decoding result of the identity of the target base station does not match any of the at least one predictive identity: determining whether there is a next redirection frequency which has been determined to be the high priority list; decoding an identity of a target base station at a next redirection frequency which has been determined to be the high priority list when there is the next redirection frequency which has been determined to be the high priority list; otherwise, the processor 105 would enable the transceiver 101 to receive the system information of the target base station when there is no next redirection frequency which has been determined to be the high priority list.

It shall be noted that, each of the at least one predictive identity is the identity which corresponds to each of the at least one matched radio frequency channel number respectively. For example, as shown in FIG. 6A, the UE 1 would decode an identity of a target base station at a redirection frequency ARFCN-4 which has been classified into the high priority list first. Since there is only one matched second type base station information set where the recorded radio frequency channel number matches the redirection frequency ARFCN-4 (i.e., there is only one matched radio frequency channel number), there is only one predictive identity (i.e., BSIC-k) for the redirection frequency ARFCN-4.

Then, UE 1 would receive the system information of the target base station at the redirection frequency ARFCN-4 if the decoding result is the same as the predictive identity. Otherwise, if a decoding result of the identity of the target base station at the redirection frequency ARFCN-4 is BSIC-x instead of BSIC-k, which means that the decoding result of the identity of the target base station does not match (i.e., is different from) the predictive identity, the UE 1 would not choose the redirection frequency ARFCN-4 to set up a circuit-switched service. Instead, since there is another redirection frequency (i.e., ARFCN-1) which has been classified into the high priority list, the UE 1 would further decode an identity of a target base station at the redirection frequency ARFCN-1. In this case, since the redirection frequency ARFCN-1 is the last redirection frequency in the high priority list, the UE 1 would receive the system information of the target base station at the redirection frequency ARFCN-1 directly no matter whether the decoding result is the same as the predictive identity (i.e., BSIC-x) or not.

Figure 6B:
FIG. 6B is a schematic diagram illustrating how redirection frequencies are prioritized according to the fifth embodiment of the present invention.

In another scenario as shown in FIG. 6B, the UE 1 would try to decode an identity of a target base station at the redirection frequency ARFCN-1 first. In this case, since there are two second type base station information sets where the recorded radio frequency channel numbers match the redirection frequency ARFCN-1 (i.e., there is two matched radio frequency channel numbers), there are two predictive identities (i.e., BSIC-x and BSIC-t) for the redirection frequency ARFCN-1.

Then, the UE 1 would determine whether a decoding result of the identity of the target base station at the redirection frequency ARFCN-1 matches one of predictive identities (i.e., BSIC-x and BSIC-t). And, the UE 1 enables the transceiver 101 to receive system information of the target base station when the decoding result of the identity of the target base station (e.g., BSIC-t) matches one of the predictive identities (i.e., BSIC-x and BSIC-t). Otherwise, the UE 1 would try to decode an identity of a target base station at next redirection frequency ARFCN-4 (which is also classified into the high priority list) if the decoding result is not BSIC-x nor BSIC-t.

Figure 7A:
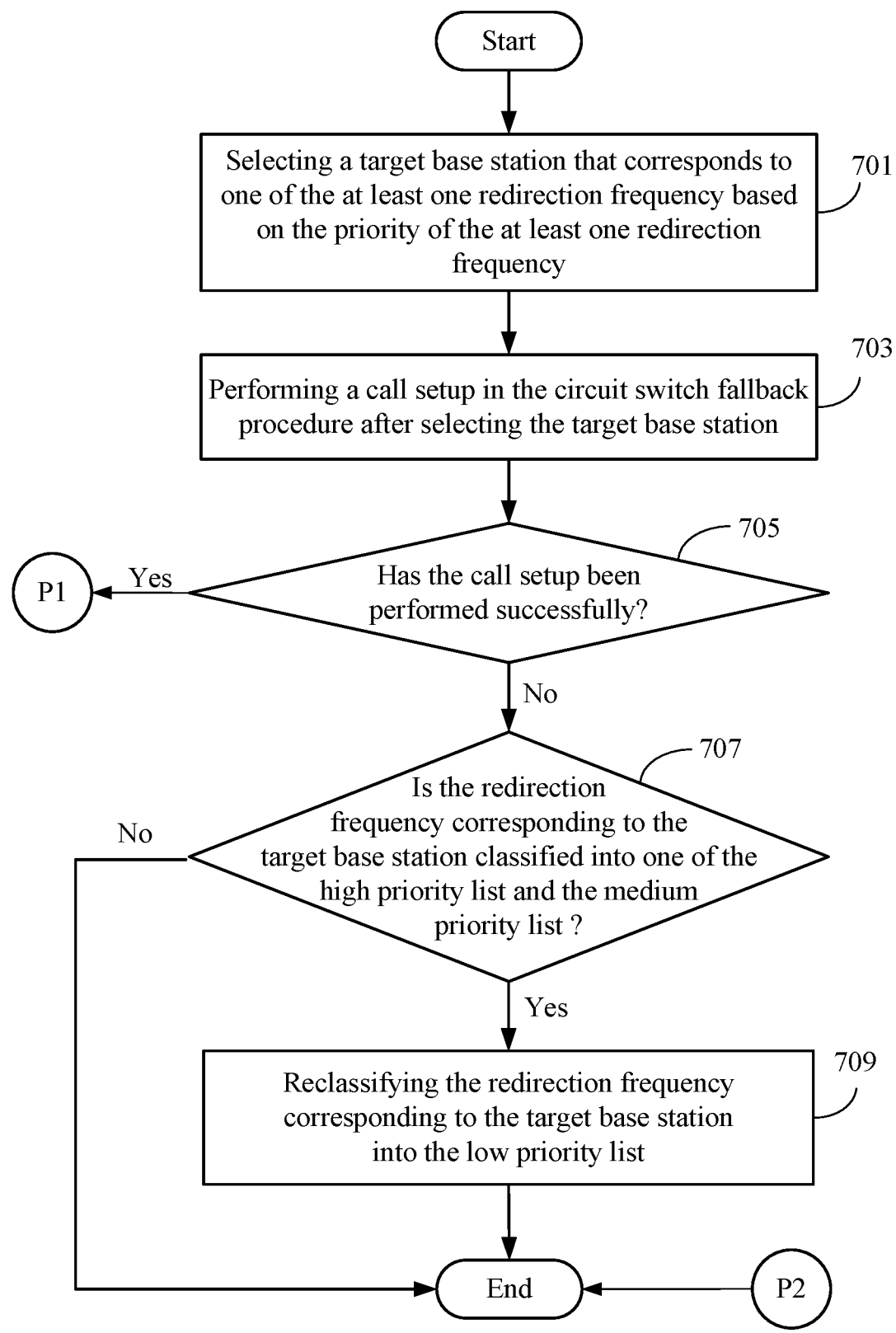
FIGS. 7A-7B are flowchart diagrams illustrating a prioritization adjustment method according to the sixth embodiment of the present invention.
Figure 7B:
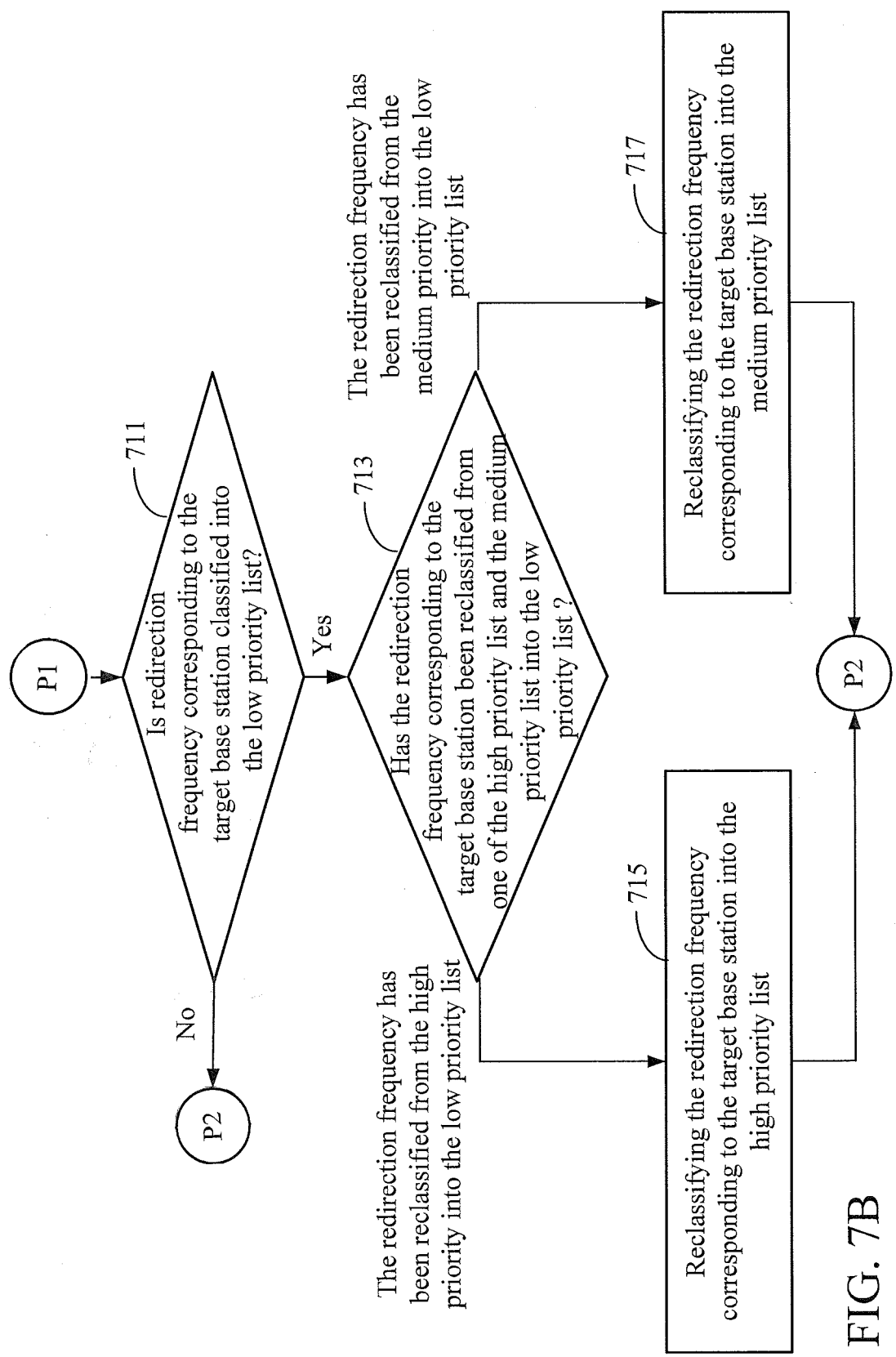

The sixth embodiment of the present invention is depicted in FIGS. 7A-7B. In this embodiment, the UE 1 is able to adjust the priority of a selected redirection frequency after making a CSFB call. Specifically, the processor 105 further executes the following operations. First, step 701 is executed to select a target base station that corresponds to one of the at least one redirection frequency based on the priority of the at least one redirection frequency. As previously described, the UE 1 would select a target base station at a redirection frequency which is ordered in a high priority (i.e., select the redirection frequency ordered in the first priority) to set up a circuit-switched service.

Then, step 703 is executed to perform a call setup in the circuit switch fallback procedure after selecting the target base station. Next, step 705 is executed to determine whether the call setup has been performed successfully or not. If the call setup has not been performed successfully, step 707 is executed to determine whether the redirection frequency corresponding to the target base station is classified into one of the high priority list and the medium priority list or not.

If the redirection frequency corresponding to the target base station is classified into one of the high priority list and the medium priority list in step 707, then step 709 is executed to reclassify the redirection frequency corresponding to the target base station into the low priority list for next CSFB procedure usage. Otherwise, there is no action to take. On the other hand, if the call setup has been performed successfully in step 705, then step 711 is further executed to determine whether the redirection frequency corresponding to the target base station is classified into the low priority list or not. If the redirection frequency corresponding to the target base station is classified into the low priority list in step 711, then step 713 is further executed to determine whether the redirection frequency corresponding to the target base station has been reclassified from the high priority list or from the medium priority list into the low priority list. Otherwise, there is no action to adjust the priority of the selected redirection frequency.

If the determination result is "high priority list" in step 713, then step 715 is executed to reclassify the redirection frequency corresponding to the target base station into the high priority list for next CSFB procedure usage. Otherwise, step 717 is executed to reclassify the redirection frequency corresponding to the target base station into the medium priority list for next CSFB procedure usage if the determination result is "medium priority list" in step 713. It is noted that, on the other hand, if the redirection frequency corresponding to the target base station has not been reclassified from one of the high priority list and the medium priority list into the low priority list in step 713, there is no action to adjust the priority of the selected redirection frequency.

Moreover, in another embodiment, the processor 105 may further initiate a timer after executing step 709 (which is not shown in FIGS. 7A-7B). Afterwards, the processor 105 would reclassify the redirection frequency corresponding to the target base station into one of the high priority list and the medium priority list when the timer is expired. Specifically, when the timer is expired, the processor 105 would reclassify the redirection frequency into the high priority list if the redirection frequency has been reclassified from the high priority list into the low priority list during steps 707-709. Similarly, when the timer is expired, the processor 10 would reclassify the redirection frequency into the medium priority list if the redirection frequency has been reclassified from the medium priority list into the low priority list during steps 707-709.

Figure 8A:
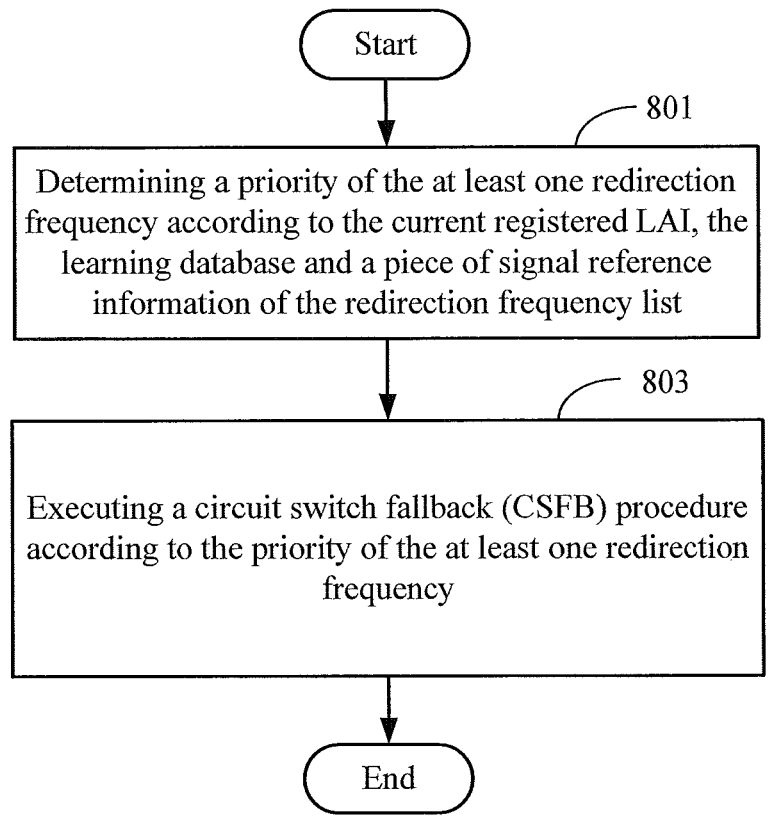
FIG. 8A is a flowchart diagram of a circuit-switched method according to the seventh embodiment of the present invention.

The seventh embodiment of the present invention is a circuit-switched fallback (CSFB) method, the flow chart of which is shown in FIG. 8A. The circuit switch fallback (CSFB) method is for use in a user equipment, e.g., the UE 1 of the first to sixth embodiments. The user equipment comprises a storage, a transceiver and a processor. The transceiver is configured to receive a radio resource control (RRC) connection release message containing a redirection frequency list from an initial base station. The initial base station provides a packet-switched service, and the redirection frequency list includes at least one redirection frequency. The storage is configured to store a learning database, a piece of signal reference information of the redirection frequency list and a current registered local area identity (LAI). The processor is electrically connected to the storage and the transceiver. The CSFB method is executed by the processor.

First, step 801 is executed to determine a priority of the at least one redirection frequency according to the current registered LAI, the learning database and a piece of signal reference information of the redirection frequency list. Then, step 803 is executed to execute a circuit switch fallback (CSFB) procedure according to the priority of the at least one redirection frequency.

Figure 8B:
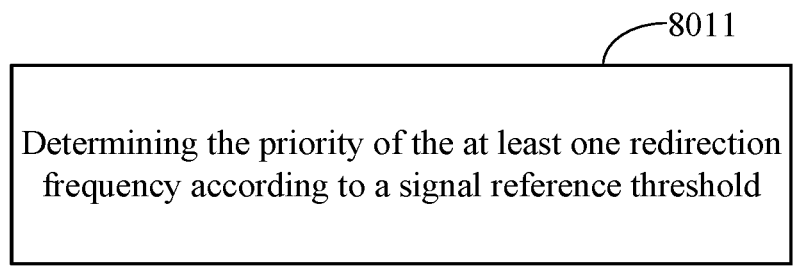
FIGS. 8B-8D, 9A, 9B and 10 are flowchart diagrams of a circuit-switched method according to the another embodiment of the present invention.
Figure 8C:
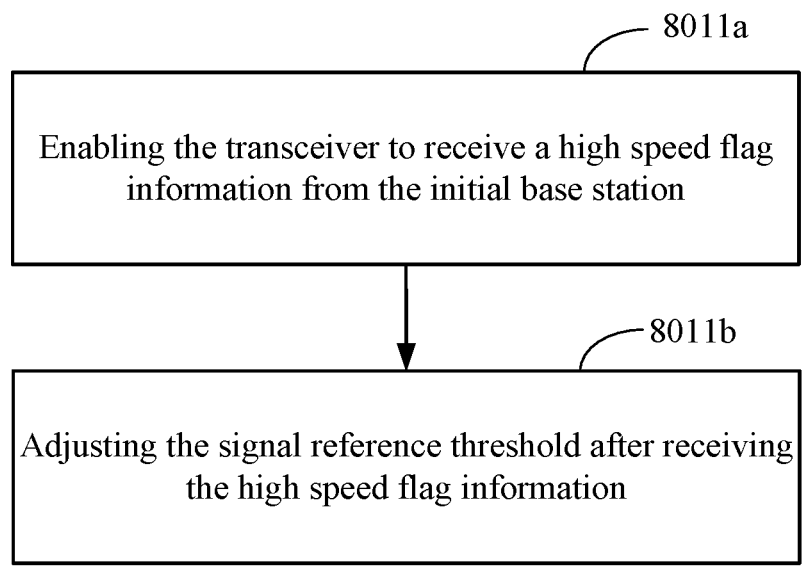

In other embodiments, the CSFB method further comprises the following step of generating the signal reference information by measuring a received signal reference at each of the at least one redirection frequency via the transceiver. In addition, in another embodiment, as shown in FIG. 8B, the CSFB method further comprises step 8011. Step 8011 is further executed to determine the priority of the at least one redirection frequency according to a signal reference threshold. Besides, step 8011 may further include steps 8011a and 8011b. First, step 8011a is executed to enable the transceiver to receive a high speed flag information from the initial base station. Next, step 8011b is executed to adjust the signal reference threshold after receiving the high speed flag information.

Furthermore, in other embodiments, the learning database may further include a plurality of association records. Each of the association records is an association between a first type base station and a second type base station. The first type base station provides the packet-switched service and the second type base station provides a circuit-switched service and a packet-switched service. Besides, each of the association records may further include an identity of the first type base station and at least one second type base station information set, each of the at least one second type base station information set includes a radio frequency channel number, an identity of the second type base station and a location area identity (LAI).

Figure 8D:
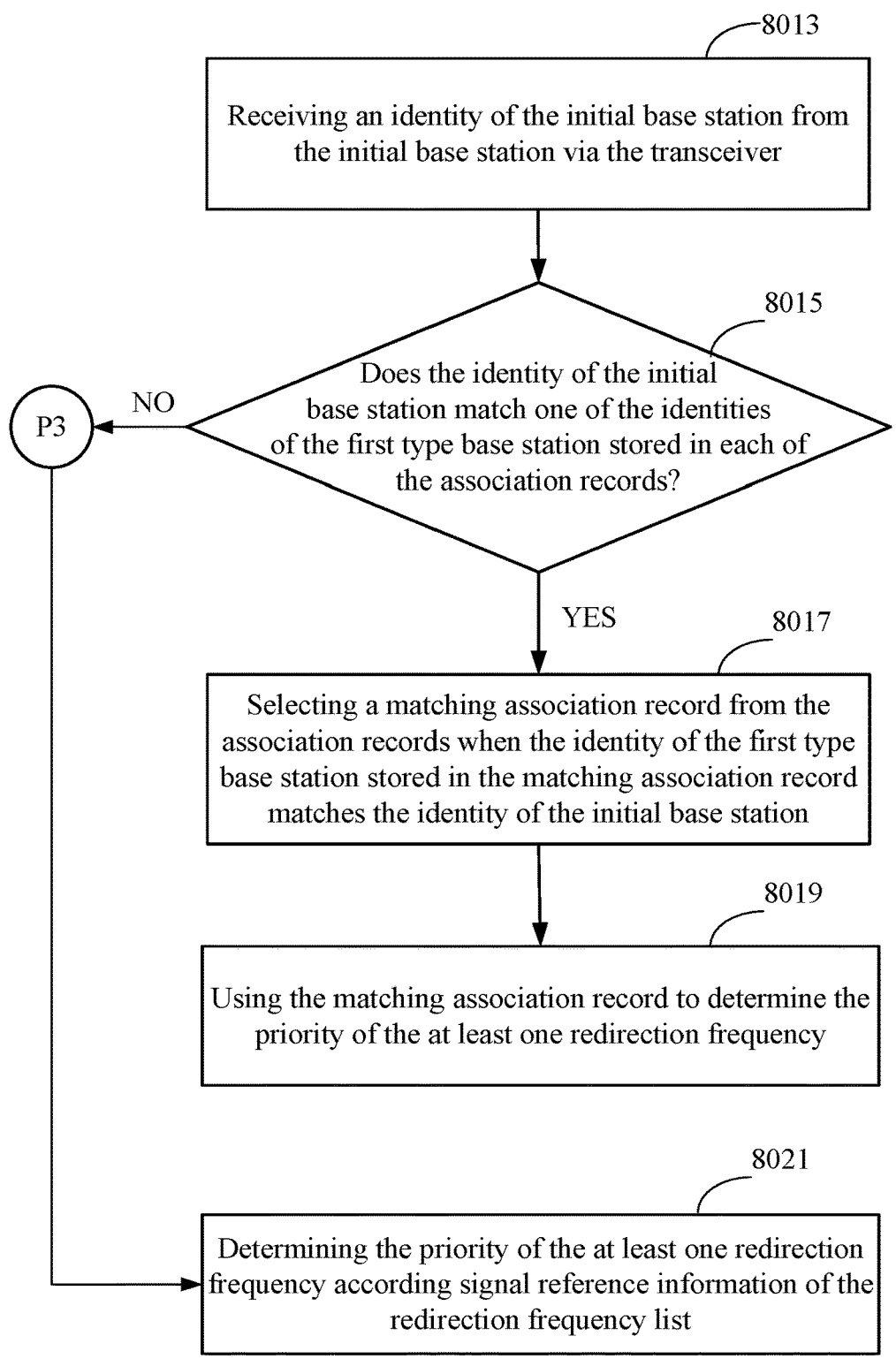

Moreover, in another embodiment as shown in FIG. 8D, the CSFB method further comprising steps 8013 to 8021. First, step 8013 is executed to receive an identity of the initial base station from the initial base station via the transceiver. Second, step 8015 is executed to determine whether the identity of the initial base station matches one of the identities of the first type base station stored in each of the at least one association records or not. If the determination result is "YES" in step 8015, then step 8017 is executed to select a matching association record from the association records when the identity of the first type base station stored in the matching association record matches the identity of the initial base station, wherein the matching association record is one of the association records.

Otherwise, step 8021 is executed to determine the priority of the at least one redirection frequency according signal reference information of the redirection frequency list. On the other hand, after step 8017, step 8019 is executed to use the matching association record to determine the priority of the at least one redirection frequency.

In one embodiment, the CSFB method further comprises the following steps for each of the at least one redirection frequency: classifying the at least one redirection frequency into a high priority list, a medium priority list and a low priority list respectively according to the matching association record; and determining the priority of the at least one redirection frequency as the following order: the high priority list, the medium priority list, the low priority list.

Figure 9A:
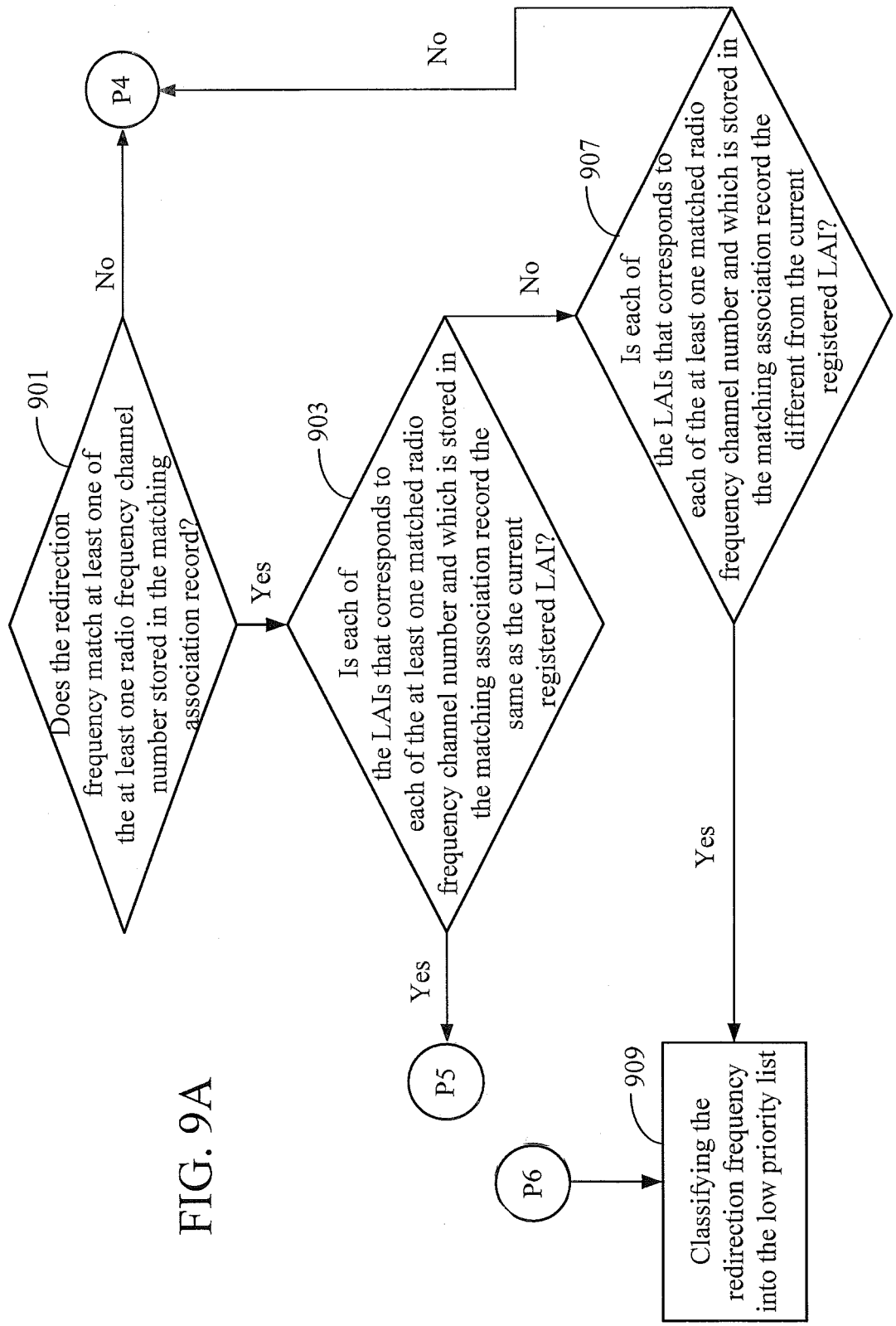
Figure 9B:
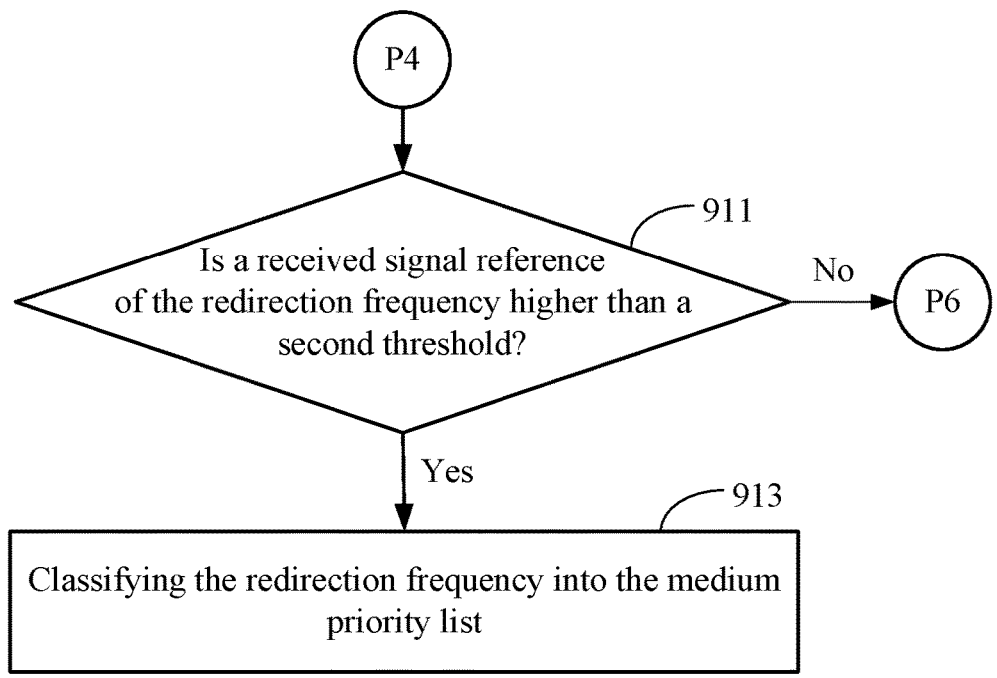
Figure 9B:
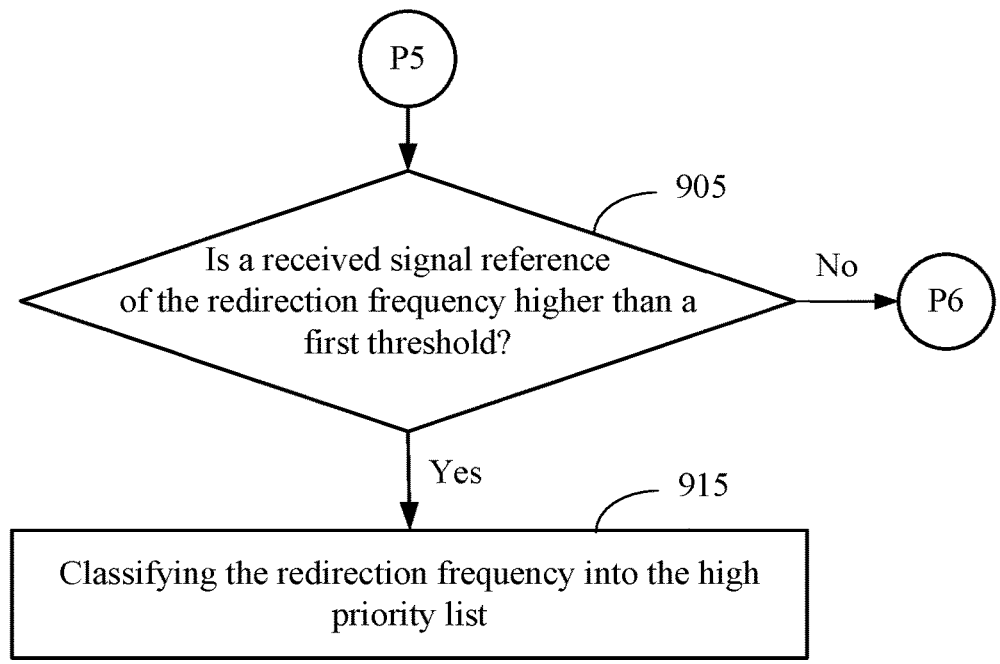

In other embodiments, as shown in FIGS. 9A-9B, the CSFB method further comprises steps 901 to 915. First, step 901 is executed to determine whether the redirection frequency matches at least one of the at least one radio frequency channel number stored in the matching association record. If it is "NO" in step 901, then step 911 is executed determine whether a received signal reference at the redirection frequency is higher than a second threshold. If the determination result is "YES" in step 911, then step 913 is executed to classify the redirection frequency into the medium priority list. Conversely, step 909 is executed to classify the redirection frequency into the low priority list if the received signal reference at the redirection frequency is lower than the second threshold (i.e., the determination result is "NO" in step 911).

On the other hand, if it is "YES" in step 901, then step 903 is executed to determine whether each of the LAIs that corresponds to each of the at least one matched radio frequency channel number and which is stored in the matching association record is the same as the current registered LAI. If the determination result is "YES" in step 903, then step 905 is executed to determine whether a received signal reference at the redirection frequency is higher than a first threshold. If the determination result is "YES" in step 905, then step 915 is further executed to classify the redirection frequency into the high priority list. Otherwise, step 909 is executed to classify the redirection frequency into the low priority list if the received signal reference at the redirection frequency is lower than the first threshold (i.e., the determination result is "NO" in step 905). On the other hand, if it is "NO" in step 903, then step 907 is executed to determine whether each of the LAIs that corresponds to each of the at least one matched radio frequency channel number and which is stored in the matching association record is different from the current registered LAI. If it is "YES" in step 907, then step 909 is executed to classify the redirection frequency into the low priority list. Otherwise, step 911 is executed to classify the redirection frequency into one of the medium priority list and the low priority list as aforementioned.

In other words, the CSFB method further comprises the following steps for each of the at least one redirection frequency included in the redirection frequency list: determining whether the redirection frequency matches at least one of the at least one radio frequency channel number stored in the matching association record or not; and classifying the redirection frequency into one of the high priority list and the low priority list according to the following criteria: (a8) the redirection frequency matches at least one of the at least one radio frequency channel number stored in the matching association record; (b8) the LAI which corresponds to each of the at least one matched radio frequency channel number and which is stored in the matching association record is the same as the current registered LAI; and (c8) the received signal reference at the redirection frequency is higher than a first threshold.

Specifically, the CSFB method further includes the steps of classifying the redirection frequency into the high priority list when all of the above criteria (a8), (b8) and (c8) are satisfied and classifying the redirection frequency into the low priority list when only criteria (a8) and (b8) are satisfied. Additionally, the CSFB method further includes the step of ordering the at least one redirection frequency which has been classified into the high priority list according to the received signal reference of each of the at least one redirection frequency.

On the other hand, the CSFB method further comprises the following steps for each of the at least one redirection frequency included in the redirection frequency list: determining whether the redirection frequency matches at least one of the at least one radio frequency channel number stored in the matching association record; and classifying the redirection frequency into the low priority list when the following criteria are satisfied. First, the redirection frequency matches at least one of the at least one radio frequency channel number stored in the matching association record. Second, the LAI which corresponds to each of the at least one matched radio frequency channel number and which is stored in the matching association record is different from the current registered LAI.

On the other hand, the CSFB method further comprises the following steps for each of the at least one redirection frequency included in the redirection frequency list: determining whether the redirection frequency matches at least one of the at least one radio frequency channel number stored in the matching association record; and classifying the redirection frequency into one of the medium priority list and the low priority list according to the following criteria. First, the redirection frequency does not match any of the at least one radio frequency channel number stored in the matching association record, or the redirection frequency matches more than one of the at least one radio frequency channel number stored in the matching association record and not all of the LAIs that correspond to the matched radio frequency channel numbers are the same as the current registered LAI. Second, the received signal reference of the redirection frequency is higher than a second threshold. The CSFB method further comprises the following steps of classifying the redirection frequency into the medium priority list when both of the first criterion and the second criterion are satisfied and classifying the redirection frequency into the low priority list when only the first criterion is satisfied.

Additionally, in another embodiment, each of the at least one second type base station information set further includes mobile switching center (MSC) pool information. And the CSFB method further comprises the following steps of classifying the redirection frequency into a lowest priority list when a predictive MSC pool of the redirection frequency is different from a current MSC pool corresponding to the current registered LAI used by the user equipment, wherein the predictive MSC pool is determined by the MSC pool information which corresponds to the at least one matched radio frequency channel number.

Figure 10:
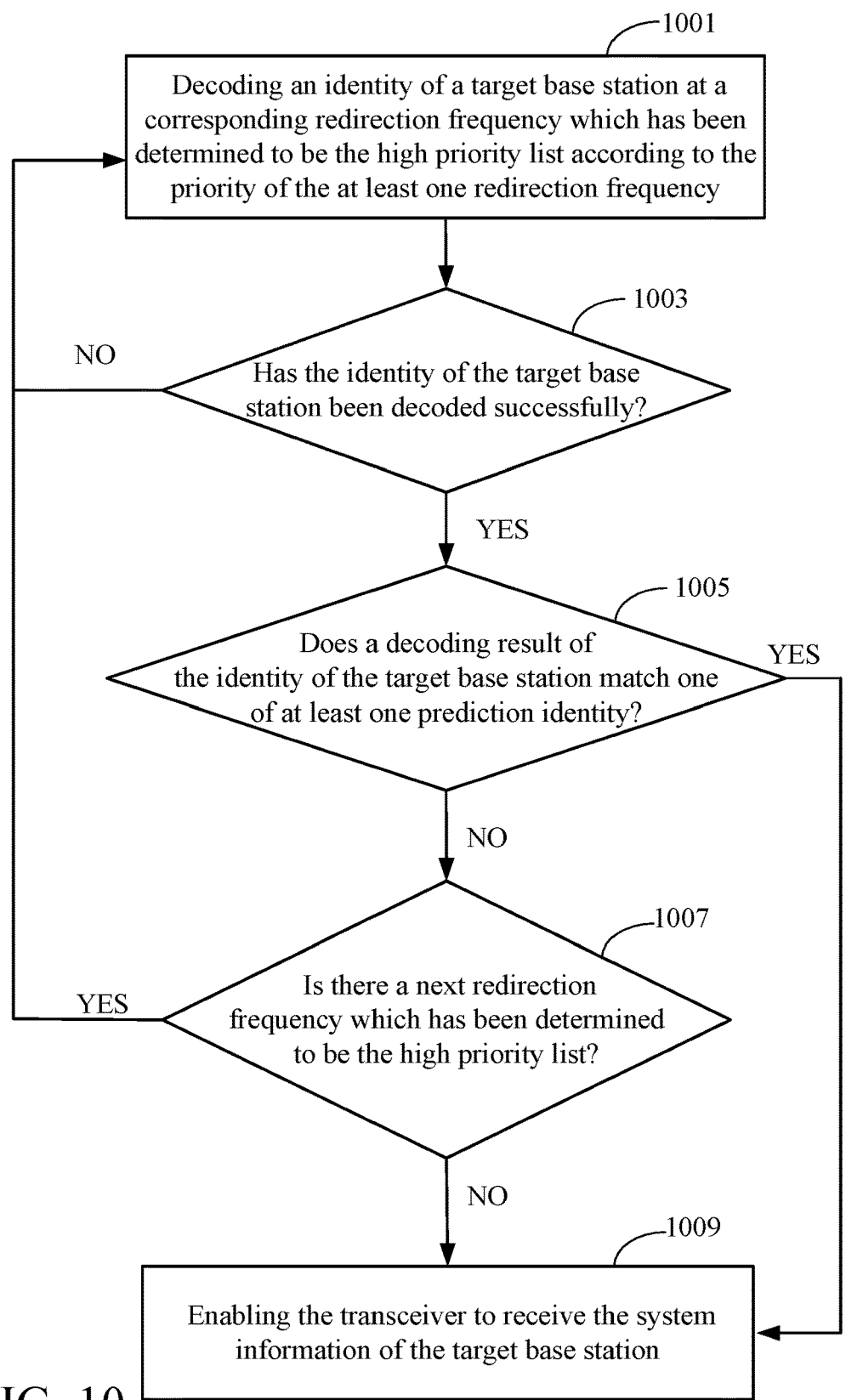

In addition, in another embodiment as shown in FIG. 10, the CSFB method further comprises steps 1001 to 1009. First, step 1001 is executed to decode an identity of a target base station at a corresponding redirection frequency which has been determined to be the high priority list according to the priority of the at least one redirection frequency. Then, step 1003 is executed to determine whether the identity of the target base station has been decoded successfully. If it is "YES" in step 1003, then step 1005 is executed to determine whether a decoding result of the identity of the target base station matches one of at least one predictive identity, wherein each of the at least one predictive identity is the identity which corresponds to each of the at least one matched radio frequency channel number respectively. If it is "YES" in step 1005, then step 1009 is executed to enable the transceiver to receive system information of the target base station. Otherwise, step 1007 is executed to determine whether there is a next redirection frequency which has been determined to be the high priority list.

If there is no next redirection frequency which has been determined to be the high priority list in step 1007, then step 1009 is executed to enable the transceiver to receive the system information of the target base station. Otherwise, the CSFB method would turn back to execute step 1001. On the other hand, if it is "NO" in step 1003, the CSFB method also turns back to execute step 1001.

In addition, in other embodiments, the CSFB method further comprising the following steps: decoding an identity of a target base station at a corresponding redirection frequency according to the priority of the at least one redirection frequency; and enabling the transceiver to receive system information of the target base station when the identity of the target base station has been decoded successfully.

Moreover, the CSFB method further comprises the following steps: receiving first learning information in an initial inter radio access technology (RAT) procedure via the transceiver; storing the first learning information into one association record via the storage; establishing the learning database based on the one association record; and updating the learning database once another inter RAT procedure has been executed; wherein the first learning information stored in the one association record include an identity of a first type base station and at least one second type base station information set, and the at least one second type base station information set includes a radio frequency channel number, an identity of a second type base station and a location area identity (LAI), wherein the second type base station provides a circuit-switched service and a packet-switched service.

Besides, the CSFB method further comprises the following step of adding another redirection frequency into the redirection frequency list according to the learning database. In addition to the aforesaid steps, the CSFB method of the present invention can also execute all the operations and corresponding functions set forth in the first to sixth embodiment. How to execute these operations and functions will be readily appreciated by those of ordinary skill in the art based on the explanation of the first to sixth embodiments, and thus, will not be further described herein.

According to the above descriptions, the CSFB mechanism of the present invention enables the UE to prioritize the redirection frequencies by utilizing the established learning database so as to enhance the possibility of selecting a target base station whose corresponding location area identity (LAI) is the same as the current registered LAI of the UE. Accordingly, the UE of the present invention is capable of avoiding CSFB latency and reducing the probability of an incoming call failure.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment, comprising:
a transceiver, being configured to receive a radio resource control (RRC) connection release message containing a redirection frequency list from an initial base station, wherein the initial base station provides a packet-switched service, and the redirection frequency list includes at least one redirection frequency;
a storage, being configured to store a learning database, a current registered local area identity (LAI) and a piece of signal reference information of the redirection frequency list; and
a processor, being electrically connected to the storage and the transceiver and configured to determine a priority of the at least one redirection frequency according to the current registered LAI, the learning database and the piece of signal reference information of the redirection frequency list, and to execute a fallback procedure according to the priority of the at least one redirection frequency.

2. The user equipment as claimed in claim 1, wherein the processor generates the signal reference information by measuring a received signal reference at each of the at least one redirection frequency via the transceiver.

3. The user equipment as claimed in claim 1, wherein the processor further determines the priority of the at least one redirection frequency according to a signal reference threshold, the transceiver further receives a high speed flag information from the initial base station, and the processor further adjusts the signal reference threshold after receiving the high speed flag information.

4. The user equipment as claimed in claim 1, wherein the learning database further includes a plurality of association records, each of the association records is an association between a first type base station and a second type base station, the first type base station provides the packet-switched service and the second type base station provides a circuit-switched service and a packet-switched service.

5. The user equipment as claimed in claim 4, wherein each of the association records includes an identity of the first type base station and at least one second type base station information set, each of the at least one second type base station information set includes a radio frequency channel number, an identity of the second type base station and a location area identity (LAI).

6. The user equipment as claimed in claim 5, wherein the transceiver further receives an identity of the initial base station from the initial base station, and the processor further executes the following steps:
  determining whether the identity of the initial base station matches one of the identities of the first type base station stored in each of the association records or not;
  selecting a matching association record from the association records when the identity of the first type base station stored in the matching association record matches the identity of the initial base station, wherein the matching association record is one of the association records; and
  using the matching association record to determine the priority of the at least one redirection frequency.

7. The user equipment as claimed in claim 6, wherein for each of the at least one redirection frequency, the processor further executes the following steps:
  classifying the at least one redirection frequency into a high priority list, a medium priority list and a low priority list respectively according to the matching association record; and
  determining the priority of the at least one redirection frequency as the following order:
    the high priority list, the medium priority list, the low priority list.

8. The user equipment as claimed in claim 7, wherein for each of the at least one redirection frequency included in the redirection frequency list, the processor further determines whether the redirection frequency matches at least one of the at least one radio frequency channel number stored in the matching association record or not, and classifies the redirection frequency into one of the high priority list and the low priority list according to the following criteria:
  (a8) the redirection frequency matches at least one of the at least one radio frequency channel number stored in the matching association record;
  (b8) the LAI which corresponds to each of the at least one matched radio frequency channel number and which is stored in the matching association record is the same as the current registered LAI; and
  (c8) a received signal reference at the redirection frequency is higher than a first threshold;
  wherein the processor classifies the redirection frequency into the high priority list when all of the criteria (a8), (b8) and (c8) are satisfied;
  wherein the processor further orders the at least one redirection frequency which has been classified into the high priority list according to the received signal reference of each of the at least one redirection frequency;
  wherein the processor classifies the redirection frequency into the low priority list when only criteria (a8) and (b8) are satisfied.

9. The user equipment as claimed in claim 8, wherein the processor further executes the following operations:
  (a9) decoding an identity of a target base station at a corresponding redirection frequency which has been determined to be the high priority list according to the priority of the at least one redirection frequency;
  (b9) determining whether a decoding result of the identity of the target base station matches one of at least one predictive identity, wherein each of the at least one predictive identity is the identity which corresponds to each of the at least one matched radio frequency channel number respectively;
  (c9) enabling the transceiver to receive system information of the target base station when the decoding result of the identity of the target base station matches one of the at least one predictive identity; and
  (d9) determining whether there is a next redirection frequency which has been determined to be the high priority list when the decoding result of the identity of the target base station does not match any of the at least one predictive identity;
  (e9) after step (d9), executing step (a9) when there is the next redirection frequency which has been determined to be the high priority list;
  (f9) after step (d9), enabling the transceiver to receive the system information of the target base station when there is no next redirection frequency which has been determined to be the high priority list.

10. The user equipment as claimed in claim 7, wherein for each of the at least one redirection frequency included in the redirection frequency list, the processor further determines whether the redirection frequency matches at least one of the at least one radio frequency channel number stored in the matching association record, and classifies the redirection frequency into the low priority list when the following criteria are satisfied:
  (a10) the redirection frequency matches at least one of the at least one radio frequency channel number stored in the matching association record; and
  (b10) the LAI which corresponds to each of the at least one matched radio frequency channel number and which is stored in the matching association record is different from the current registered LAI.

11. The user equipment as claimed in claim 10, wherein each of the at least one second type base station information set further includes mobile switching center (MSC) pool information, and the processor further classifies the redirection frequency into a lowest priority list when a predictive MSC pool of the redirection frequency is different from a current MSC pool corresponding to the current registered LAI used by the user equipment, wherein the predictive MSC pool is determined by the MSC pool information which corresponds to the at least one matched corresponding radio frequency channel number.

12. The user equipment as claimed in claim 7, wherein for each of the at least one redirection frequency included in the redirection frequency list, the processor further determines whether the redirection frequency matches at least one of the at least one radio frequency channel number stored in the matching association record, and classifies the redirection frequency into one of the medium priority list and the low priority list according to the following criteria:
  (a12) the redirection frequency does not match any of the at least one radio frequency channel number stored in the matching association record, or the redirection frequency matches more than one of the at least one radio frequency channel number stored in the matching association record and not all of the LAIs that correspond to the matched radio frequency channel numbers are the same as the current registered LAI; and (b12) a received signal reference of the redirection frequency is higher than a second threshold;
wherein the processor classifies the redirection frequency into the medium priority list when all of the criteria (a12) and (b12) are satisfied;
wherein the processor classifies the redirection frequency into the low priority list when only the criterion (a12) is satisfied.

13. The user equipment as claimed in claim 7, wherein the processor further executes the following operations:
   (a13) selecting a target base station that corresponds to one of the at least one redirection frequency based on the priority of the at least one redirection frequency;
   (b13) performing a call setup in the fallback procedure after selecting the target base station;
   (c13) determining whether the call setup has been performed successfully or not;
   (d13) determining whether the redirection frequency corresponding to the target base station is classified into one of the high priority list and the medium priority list or not when the call setup has been performed unsuccessfully; and
   (e13) after step (d13), reclassifying the redirection frequency corresponding to the target base station into the low priority list for next fallback procedure usage if the redirection frequency corresponding to the target base station is classified into one of the high priority list and the medium priority list.

14. The user equipment as claimed in claim 13, wherein the processor further executes the following steps:
   after step (e13), reclassifying the redirection frequency corresponding to the target base station into one of the high priority list and the medium priority list when a timer is expired.

15. The user equipment as claimed in claim 13, wherein the processor further executes the following operations after step (c13):
   (d15) determining whether the redirection frequency corresponding to the target base station is classified into the low priority list or not when the call setup has been performed successfully; and
   (e15) after step (d15), determining whether the redirection frequency corresponding to the target base station has been reclassified from one of the high priority list and medium priority list into the low priority list previously when the redirection frequency corresponding to the target base station is classified into the low priority list; and
   (f15) after step (e15), reclassifying the redirection frequency corresponding to the target base station into one of the high priority list and medium priority list for next fallback procedure usage if the redirection frequency corresponding to the target base station has been reclassified from one of the high priority list and medium priority list into the low priority list previously.

16. The user equipment as claimed in claim 1, wherein the processor further decodes an identity of a target base station at a corresponding redirection frequency according to the priority of the at least one redirection frequency and enables the transceiver to receive system information of the target base station when the identity of the target base station has been decoded successfully.

17. The user equipment as claimed in claim 1, wherein the transceiver is further configured to receive first learning information in an initial inter radio access technology (RAT) procedure, the storage further stores the first learning information into one association record, and the processor establishes the learning database based on the one association record and further updates the learning database once another inter RAT procedure has been executed, wherein the first learning information stored in the one association record include an identity of a first type base station and at least one second type base station information set, and the at least one second type base station information set includes a radio frequency channel number, an identity of a second type base station and a location area identity (LAI), wherein the second type base station provides a circuit-switched service and a packaged-switched service.

18. The user equipment as claimed in claim 1, wherein the transceiver is further configured to electrically connected to a first subscriber identity module (SIM) unit and a second SIM unit, wherein the transceiver is further connected to a first type base station that provides the packaged-switched service via the first SIM unit and connected to a second type base station that provides a circuit-switched service and a packaged-switched service via the second SIM unit, and the processor further retrieves first connection information from the first SIM unit and second connection information from the second SIM unit so as to enable the storage to store an association record of the first connection information and the second connection information into the learning database.

19. The user equipment as claimed in claim 1, wherein the processor further adds another redirection frequency into the redirection frequency list according to the learning database.

20. A fallback method for use in a user equipment, the user equipment comprising a storage, a transceiver and a processor, the storage being configured to store a learning database and a current registered local area identity (LAI), the transceiver being configured to receive a radio resource control (RRC) connection release message containing a redirection frequency list from an initial base station, the initial base station providing a packet-switched service, and the redirection frequency list including at least one redirection frequency, and the processor being electrically connected to the storage and the transceiver, the fallback method being executed by the processor and comprising the following step:
   determining a priority of the at least one redirection frequency according to the current registered LAI, the learning database and a piece of signal reference information of the redirection frequency list; and
   executing a fallback procedure according to the priority of the at least one redirection frequency.

* * * * *